United States Patent [19]
Dixon et al.

[11] Patent Number: 5,088,048
[45] Date of Patent: Feb. 11, 1992

[54] MASSIVELY PARALLEL PROPOSITIONAL REASONING

[75] Inventors: Michael Dixon, San Francisco; Johan de Kleer; John O. Lamping, both of Los Altos, all of Calif.

[73] Assignee: Xerox Corporation, Stamford, Conn.

[21] Appl. No.: 205,125

[22] Filed: Jun. 10, 1988

[51] Int. Cl.$^5$ .................. G09C 00/00; G10L 00/00
[52] U.S. Cl. .................. 395/11; 364/274.7; 364/276.8; 364/274.5; 364/972.3; 364/DIG. 1; 364/DIG. 2
[58] Field of Search ... 364/200, 900, 274, 200 MS File, 364/513

[56] References Cited

U.S. PATENT DOCUMENTS

| | | | |
|---|---|---|---|
| 3,987,286 | 10/1976 | Muehldorf | 235/152 |
| 4,468,736 | 8/1984 | Desantis et al. | 364/200 |
| 4,675,829 | 6/1987 | Clemenson | 364/513 |
| 4,773,038 | 9/1988 | Hillis et al. | 364/900 |
| 4,814,973 | 3/1989 | Hillis | 364/200 |
| 4,918,621 | 4/1990 | Nado et al. | 364/513 |
| 4,949,243 | 8/1990 | Ali et al. | 364/200 |

FOREIGN PATENT DOCUMENTS

| | | |
|---|---|---|
| 0237218 | 9/1987 | European Pat. Off. |
| 0251594 | 1/1988 | European Pat. Off. |

OTHER PUBLICATIONS

Charles J. Petrie, Jr., "A Diffusing Computation for Truth Maintenance", Proceedings of the 1986 International Conference on Parallel Processing.
de Kleer, Johan, "An Assumption-based TMS", *Artificial Intelligence*, vol. 28, 1986, pp. 127–162.
de Kleer, Johan, "Extending the ATMS", *Artificial Intelligence*, vol. 28, 1986, pp. 163–196.
de Kleer, Johan, "Problem Solving with the ATMS", *Artificial Intelligence*, vol. 28, 1986, p. 197–224.
Vilain, M., "Heterogenous Concurrency in a Parallel Truth Maintenance System", *Proceedings, 1988 Spring Symposium Series*, Stanford University, Mar. 22–24, 1988, pp. 237–242.
de Kleer, J. and Reiter, R., "Foundations of Assumption-Based Truth Maintenance Systems: Preliminary Report", *Proceedings of the National Conference on Artificial Intelligence*, Seattle, Wash., Jul. 1987, pp. 183–188.
Charniak, E. and McDermott, D., *Introduction to Artificial Intelligence*, Addison-Wesley, Reading, Mass., 1985, pp. 255–270.

Primary Examiner—Gareth D. Shaw
Assistant Examiner—Paul Wayner

[57] ABSTRACT

Propositional reasoning is performed on a massively parallel processor, with sets of element value combinations being handled by separate processing units. A host processor operates as a problem solver generating requests for propositional reasoning, and also operates as an interface between the problem solver and the parallel processor. In response to a request that includes a formula, the interface provides one or more formulas such as justifications and class restrictions. The interface provides instructions to the parallel processor based on each of these formulas. The instruction based on each formula are provided so that the set of element value combinations handled by each processing unit is not divided or forked into two subsets until necessary. If possible, forking is avoided by forcing the value of an element to the only value consistent with the current formula. Furthermore, if no additional processing unit is available for forking, the current formula is kept on a queue of formulas, and the corresponding instructions are subsequently repeated. In this manner, the host processor orders the formulas into a sequence that reduces the number of processing units required. When necessary, a selected assumption is forced to one value to free processing units; its other value is considered subsequently by backtracking. Each element value is assigned one or more bit positions in each processing unit, but when the values in all the processing units are the same for a given element, its bit position may be reclaimed, to reduce memory requirements. The interface also responds to a request for results by sending instructions that use circuitry in the parallel processor to obtain a combined result from the processing units.

23 Claims, 16 Drawing Sheets

MASSIVELY PARALLEL PROPOSITIONAL REASONING

BACKGROUND OF THE INVENTION

The present invention relates to techniques for implementing a propositional reasoner on a parallel processor. More specifically, the invention relates to techniques for implementing an assumption-based truth maintenance system using a massively parallel processor.

A number of articles, including de Kleer, J., "An Assumption-based TMS," *Artificial Intelligence*, Vol. 28, 1986, pp. 127-162; and de Kleer J., "Extending the ATMS," *Artificial Intelligence*, Vol. 28, 1986, pp. 163-196; "Problem Solving with the ATMS," *Artificial Intelligence*, Vol. 28, 1986, pp. 197-224; and de Kleer, J., and Reiter, R., "Foundations of Assumption-based Truth Maintenance Systems: Preliminary Report," *Proceedings of the National Conference on Artificial Intelligence*, Seattle, Wash., July 1987, pp. 183-188, describe an Assumption-based Truth Maintenance System (ATMS), a propositional inference engine designed to simplify the construction of problem solvers that search complex search spaces efficiently. The ATMS represents problem states with assumptions, which correspond to primary binary choices, and nodes, which correspond to propositions whose truth is dependent on the truth of the assumptions. Dependency relationships among assumptions and nodes are determined by a domain-specific problem solver such as a conventional inference engine. The problem solver presents these relationships to the ATMS as justifications. The ATMS determines which combinations of assumptions are consistent and identifies the conclusions to which they lead.

The ATMS is conventionally implemented by extending a conventional inference engine appropriate to the problem being solved. The extension includes a propositional reasoner and an interface that receives calls from the inference engine, passes them to the propositional reasoner, and returns results to the inference engine. The inference engine, the interface, and the propositional reasoner all run on a single serial processor, such as a serial Lisp machine, through conventional programming techniques.

Vilain, M., "Heterogenous Concurrency in a Parallel Truth Maintenance System," *Proceedings, 1988 Spring Symposium Series*, Stanford University, March 22-24, 1988, pp. 237-242, which may not be prior art in relation to the present invention, describes a Truth Maintenance System (TMS) on a Multiple Instruction-Multiple Data (MIMD) multiprocessor. The parallel TMS supports a model of belief maintenance in which it operates concurrently with other problem-solving and deduction processes. Belief structures are propositions associated with nodes in a graph, the links being disjunctive clauses that constrain the truth of the nodes to which they are indexed, as illustrated in FIG. 1. Deduction is performed by constraint propagation from a node whose value is determined, with each clause of the node being checked to determine whether it constrains the truth of other nodes. The parallel strategy is to check all of a node's constraints simultaneously, as shown in FIG. 3. Because of propagation between nodes, locking or synchronization is required to prevent separate processes from setting the truth of a node simultaneously, as would occur when two clauses being checked in parallel both support the determination of the same node. A solution is shown in Appendix A. Page 241 discusses alternatives for implementing ATMS in parallel. Page 241 also indicates that exploiting the same sources of parallelism on large-scale SIMD machines is somewhat unpromising; effective SIMD truth maintenance systems may require a different set of techniques.

Charniak, E. and McDermott, D., *Introduction to Artificial Intelligence*, Addison-Wesley, Reading, Mass., 1985, pp. 255-270, describe conventional search techniques. FIG. 5-2 shows a search space that is a set of all schedules for a scheduling problem. Each schedule in the search space corresponds to a set of values for scheduled events. Pages 259-267 describe a search algorithm, and page 266 describes handling a number of states in a search space by putting states onto a square. Page 266 also describes backtracking, in which the searcher abandons a state and returns to an earlier one upon encountering an obstacle.

SUMMARY OF THE INVENTION

The present invention provides a technique that can be used to implement a propositional reasoner for a problem solver or other propositional reasoning system using a parallel processor. This technique can be used to implement ATMS using a massively parallel processor such as the Connection Machine produced by Thinking Machine Corporation. This implementation results in more than an order of magnitude speed improvement for ATMS operations, compared with serial Lisp machine implementations.

Furthermore, this implementation does not require modification of problem solvers that use the ATMS.

One aspect of the invention is based on the recognition of a problem in conventional implementations of ATMS and other such propositional reasoning systems. In general, such a system can consume a disproportionate part of the resources of a problem solving system in which it is included, slowing problem solving operations. This is true for an implementation on a serial machine, such as a Lisp machine, but is also true for a conventional implementation on a parallel processor, such as a MIMD.

One cause of this problem is a mismatch between system architecture and the computational task of propositional reasoning. This aspect of the invention is based on the discovery that a better match between architecture and computation can result in much faster propositional reasoning. Specifically, this aspect is based on the discovery that propositional reasoning can be performed very rapidly using a massively parallel processor.

A massively parallel processor conventionally includes a large number of processing units, each with its own memory. Each processing unit is thus capable of operating on the contents of its memory independently of and in parallel with the other processing units, a feature that lends itself to certain forms of computation. Although conventionally approached differently, propositional reasoning can execute efficiently using a massively parallel processor if the overall task is broken down into independently, parallel processes, each of which can then be assigned to a respective processing unit.

The overall task of propositional reasoning is to determine the logical consequences of a set of propositional formulas. To determine the logical consequences of a set of formulas, a propositional reasoner conventionally considers possible combinations of the values of elements that appear in the formulas. For the simple case in which each element is independent of each other element, C, the number of possible combinations of element values, is related to K, the number of values each element may take, and to n, the number of elements, by the equation $C = K^n$. For the familiar case in which each element is a boolean element, having either the value true or the value false, $K = 2$. In this case, if $n = 10$, for example, the number of possible combinations of values C is 1024; for $n = 20$, $C = 1,048,576$. The number of possible combinations thus increases exponentially in relation to the number of elements.

The conventional ATMS reduces the combinations that must be considered by treating subsets of the elements and by making use of dependencies between the elements. Even with these efficiencies, however, current implementations of the ATMS appear to be approaching the performance limitations of serial architectures.

As implied above, the elements that appear in a set of formulas are typically not independent of each other, so that the task of propositional reasoning cannot be divided into a separate task for each element. This aspect of the invention is based on the recognition that the task can, however, be divided into a separate task for each of a number of sets of the combinations of values of the elements. In other words, the combinations of element values are independent and can be handled in parallel. For the simple case of two boolean elements, for example, there are four combinations of values that can be handled independently and in parallel: (T,T),(T,F),(F,T), and (F,F). For the more interesting cases having a larger number of elements, the number of combinations is exponentially larger, but a set of combinations can be handled by each processing unit of a massively parallel processor, providing an excellent match between architecture and computation.

A closely related aspect of the invention is based on the recognition of basic problems in implementing a propositional reasoner on a parallel processor as described above. Some of these problems involve communication between the propositional reasoner and other components of a system. Others involve the performance of certain operations within the propositional reasoner that would be difficult to perform with other components of the system.

Even if each processing unit of the parallel processor performs propositional reasoning for a set of element value combinations, the propositional reasoner is only useful as part of a system that provides inputs to the processing units and receives their outputs. Since propositional reasoning is conventionally a serial operation, conventional systems do not provide techniques for handling input and output to a large number of parallel processing units. Therefore, this aspect of the invention solves this problem with techniques for converting a request for propositional reasoning into a request for parallel processing and for converting the results of parallel processing into a combined result for further processing. Specifically, the system can include an interface that converts a request, such as an incremental formula or a query for results, into instructions to the parallel processing units. The system can also include means for combining the results of parallel processing and providing the combined results to other components.

Even with techniques for communicating between the parallel processing units and other components of a system, there are some operations that are difficult to perform on those other components. For example, the means for combining the results of parallel processing must receive the results from all of the active processing units, placing a heavy data load on the communication link that provides the output of the parallel processor. This problem can be solved if the means for combining the results includes circuitry within the parallel processor for combining the results and providing the combined results as output from the parallel processor. The Connection Machine of Thinking Machines Corporation conveniently includes circuitry that can be used for this function.

Another set of operations that is difficult to perform on other components is the set of processor management operations that determines the set of element value combinations to be handled by each processing unit. The reason these operations are difficult to perform on other components is that like the operation of providing output, they would place a heavy data load on the communication link between the parallel processor and those other components. For example, one such operation would be to inactivate each processing unit that finds an inconsistency in its set of element value combinations; in order to do so, the other components would need to receive a signal from each processing unit indicating whether it has found an inconsistency, and would then need to provide a signal to inactivate each processing unit whose signal indicates an inconsistency. Another similar operation is to activate an additional processing unit when a processing unit finds that its set of element value combinations should be divided into two sets, each handled by a separate processor. Like inactivation, activating a new processor would place a heavy data load on the communication link.

These problems can be solved by performing such processor management operations using the parallel processing units themselves. In other words, in addition to performing propositional reasoning, each processing unit can also perform a processor management operation if the results of its propositional reasoning indicate that such an operation is required. If the results indicate that an inconsistency has been found, the processing unit can inactivate itself. If the results indicate that activation of an additional processing unit is required, the processing unit can participate in an operation that activates an additional processing unit. As in the case of combining output, the Connection Machine conveniently includes communication circuitry that can be included in the means for performing this activation function. That circuitry can provide data from a currently activated processing unit to an additional processing unit that is to be activated, so that the set of element value combinations defined by that data can be divided into two sets.

Another aspect of the invention is based on the recognition of a problem closely related to processor management operations as described above. Even though a massively parallel processor such as a Connection Machine may have 64,000 or more processing units, a propositional reasoning task may easily involve 20 or more elements, so that the total number of possible combinations of element values will far exceed the number of processing units; with 20 elements, for example, the total number of combinations of element values is $2^{20}$, or 1,048,576. If each set of element value combinations includes only one combination or a small number of combinations, the number of processing units will not be large enough to perform the propositional reasoning task with one set of combinations on each processing unit.

This problem can be solved with techniques that reduce the number of processing units required at any given time. Three types of techniques have been discovered, each of which contributes to the solution of this problem. One technique is to provide formulas to the processing units in a sequence such that the number of processing units required at any given time does not exceed the number available. A second technique is to delay the activation of additional processing units as long as possible. A third technique is to introduce backtracking when the number of processing units available is inadequate for a parallel propositional reasoning task.

The first of these techniques is based on the recognition that, when the processing units are in a given state, one formula may result in a decrease of activated processing units through inactivation, while another may increase the number of activated processing units. Therefore, the number of processing units required for propositional reasoning depends on the sequence in which the formulas are provided. Discovering the optimal sequence of formulas would require extensive computation, and is therefore not a practical way of implementing this technique.

A more practical implementation is based on the recognition that a workable sequence of formulas can be discovered through trial and error. In other words, the formulas can be initially provided in the sequence received from an inference engine. When a formula is provided that would require more processing units than are available, the formula is withdrawn and can then be subsequently retried after other formulas have been provided. For example, all of the formulas can be queued, so that a formula that cannot be handled with the available processing units is returned to the end of the queue and retried when it reaches the head of the queue, at which time it may require fewer processing units or more processing units may be available. Although this approach does not ordinarily find the optimal sequence of formulas, it is a simple way to find a sequence of formulas that does not require more processing units than are available.

The second technique, delaying activation of additional processing units, is based on the recognition that many elements value combinations do not need to be considered separately, but will be eliminated through inconsistencies involving less than all of the elements. Here again, identifying those combinations in advance would be impractical. On the other hand, it is not necessary to assume prematurely that they must be considered. Therefore, this technique can be implemented by keeping an element indeterminate until it becomes necessary to assign it a value, and by then considering only those of its possible values that it is necessary to consider. This approach can thus be implemented by providing an additional element value representing an element's indeterminate state. An element can be assigned this indeterminate value for a given processing unit until that processing unit must assign a value to that element. At that time, the processing unit can determine which of the possible values of that element must be considered for its set of element value combinations, and can activate only the number of additional processing units that are necessary to cover those values.

In effect, this approach to the second technique is based on the recognition that each processing unit can handle a set that includes a large number of element value combinations, provided that only a few of the element values are determinate at a time. The introduction of a formula may require that a given processing unit determine one or more previously indeterminate element values, and may require activation of additional processing units to handle some of the resulting subsets of element value combinations. But at any given time, the number of processing units required will be far less than the total number of possible combinations of element values.

Adding indeterminate element values as described above increases the amount of memory space required to store the value of an element. Even without this added use of space, the amount of memory space available to each processing unit may limit the number of elements that can be handled. This problem can be solved, however, by delaying the assignment of memory locations for an element until necessary and by reclaiming previously assigned memory locations that are no longer necessary.

The third technique, backtracking, is based on the recognition that parallel and sequential propositional reasoning can be combined when necessary to obtain satisfactory performance. Shifting back and forth involves substantial overhead, however, because the memory of each parallel processing unit is typically not sufficient to hold results from different sequences of propositional reasoning, so that the current results of propositional reasoning are lost when backtracking occurs. This approach should therefore be implemented by backtracking only when the number of processing units is insufficient to permit parallel propositional reasoning. At that time, each of a number of elements is forced from being indeterminate to one of its determinate values to reduce the number of processing units required. The results obtained are stored, and parallel propositional reasoning is then performed for the other determinate value of each forced element, until all combination have been handled.

This approach can be made more effective by careful selection of each element that is forced. To be an attractive candidate to be forced, an element should involve as little backtracking and as little duplication of work as possible. To solve this problem, the choice of an element to be forced can be based on the results of propositional reasoning so far including how many processing units have an indeterminate value for each element and including the balance between processing units that have determinate true and false values for each element.

The following description, the drawings and the claims further set forth these and other objects, features and advantages of the invention.

DETAILED DESCRIPTION

A. Glossary

Figure 1:
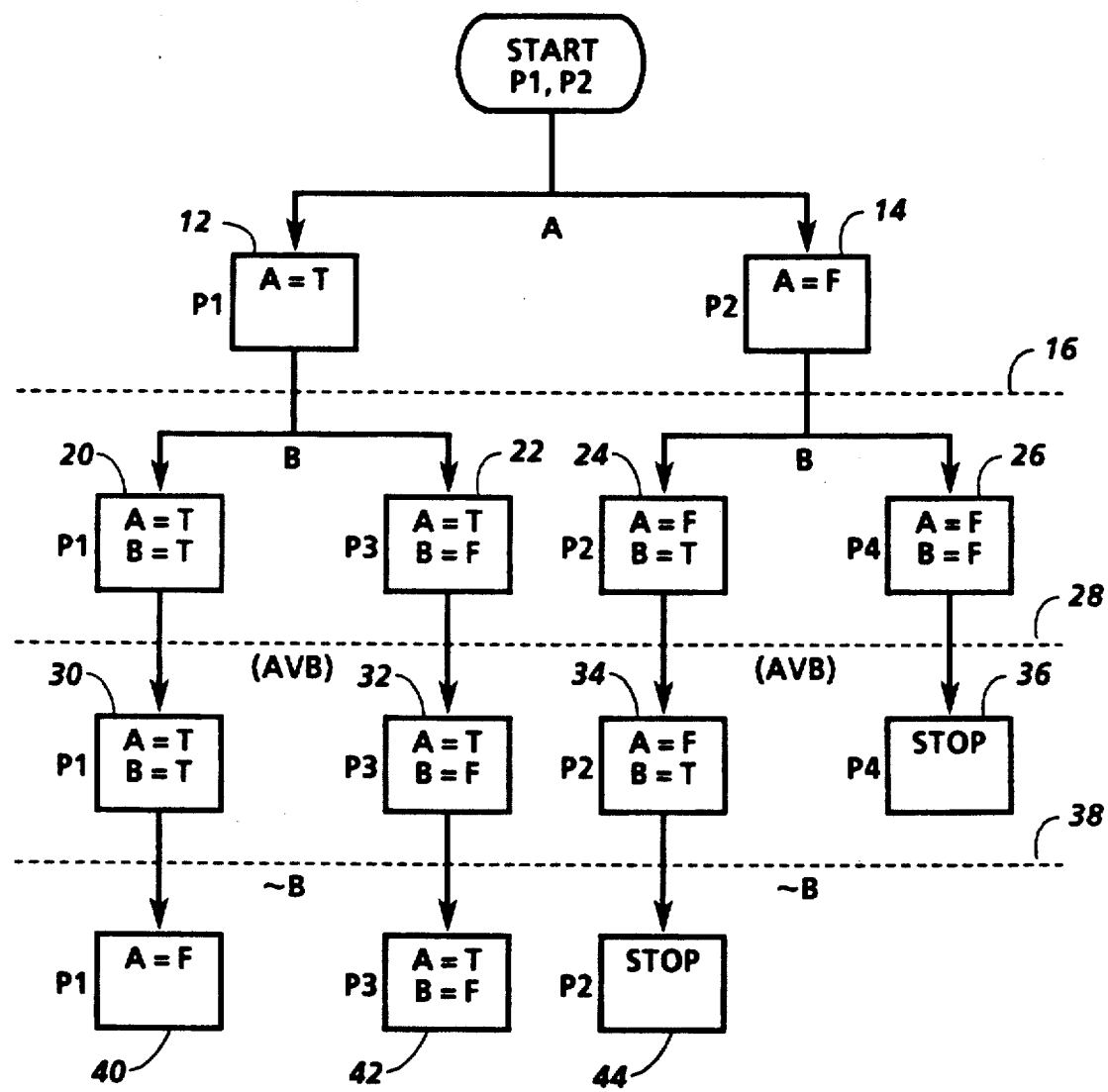
FIG. 1 is a sequential block diagram illustrating general features of parallel propositional reasoning according to the invention.

As used in this application, the following terms have the meanings indicated:

A "proposition" is a relationship between an element and one of a number of values the element may take. A proposition may be either true or false. We will generally be concerned with propositions in which elements take one of two values such as true or false, but this case is sufficient to cover cases in which an element may take one of any number of values.

A "well-formed propositional formula" or "formula" is one of the following: (a) a symbol representing an element that may be either true or false, such as a proposition; (b) the negation of a formula; (c) the conjunction of formulas; (d) the inclusive or exclusive disjunction of formulas; (e) an implication between formulas; (f) an equivalence between formulas; or one of the other logical relationships between formulas that is conventionally treated as a well-formed formula. Therefore, the term "formula," as used herein, includes justifications, class restrictions, clauses, and other specialized categories of relationships between formulas.

"Propositional reasoning" is the function of determining the consequences of a set of formulas. Therefore, it includes a wide variety of types of reasoning, including, for example, components of truth maintenance, constraint satisfaction, and any other reasoning that includes a search for combinations of element values that are consistent with a set of formulas. The "results" of propositional reasoning include the consequences that are determined, which may be expressed, for example, as minimal lists of minimal formulas that are inconsistent or that imply each of a number of elements. The "results" of propositional reasoning may also, however, include other values determined during propositional reasoning.

A "propositional reasoning task" is an instance of performing propositional reasoning on a set of formulas. A "combination of element values" or "element value combination" of such a task is a combination of values for a number of elements that occur in the formulas. For example, if the formulas include at least two elements, X and Y, two combinations of element values would be $(X=T, Y=T)$ and $(X=T, Y=F)$. A "set of element value combinations" thus includes a number of combinations of element values. Two sets of element value combinations will be treated herein as the same set if each includes all of the combinations of the other or if the combinations of one set can be expanded so that each set includes all of the combinations of the other. For example, any combinations can be expanded into two combinations, each of which includes all of the values of the parent combination plus one of the values of an additional boolean element not present in the parent combination. The combination $(X=T)$ can thus be expanded into the two combinations $(X=T, Y=T)$ and $(X=T, Y=F)$, which are the same set of element value combinations because together they define the same combination of element values as the unexpanded combination. In general, the preferred description of a set of combinations will be the description with the fewest element values, all of the expanded combinations being implicit in that minimal description.

A "processor" or "processing unit" is any combination of circuitry capable of processing data. A "parallel processor" is a processor that includes more than one processing unit, each able to process data independently and in parallel with the others. Each processing unit in a parallel processor may also be capable of emulating a number of processing units through its serial operations, but a single serial processing unit capable of emulating a number of parallel processing units is not treated herein as a parallel processor.

A "massively parallel processor" is a parallel processor with a very large number of processing units. The processing units may be connected by a communication network within the processor, as is the case for the Connection Machine of Thinking Machines Corporation, which, in one configuration, has 64,000 parallel processing units, each capable of emulating 64 parallel processing units by serial operations. Because a massively parallel processor includes so many processing units, each processing unit is typically very simple and, in particular, cannot decode its own instructions. For example, each Connection Machine processing unit can only perform single bit wide operations, and global instruction translation circuitry decodes each instruction and provides signals to each of the processing units for its execution.

"Processor management operations" are operations that determine which processing unit of a parallel processor handles which set of element value combinations. "Inactivating" is a processor management operation that stops a processing unit, so that none of the processing units handles the set of combinations it had been handling. "Activating" is a processor management operation that starts a processing unit to handle a set of combinations. An additional processing unit is conveniently activated when a set of combinations are divided into multiple sets, each handled by a separate processing unit. The processing unit that had handled the set handles one of the divided sets, while the additional processing units handles the others.

"Problem solving" is the function of reasoning from a problem description to a solution. Problem solving can be handled as a search operation, and some problem solvers search complex search spaces in finding a solution. A problem solver is typically specialized to a specific type of problem. It is prepared to accept values for the parameters that are characteristic of that type of problem and it is capable of reasoning to a solution that is appropriate for that type of problem. As noted below, a problem solver may employ propositional reasoning.

An "inference engine" is a component that performs a general reasoning function. An inference engine may be part of a problem solver and many receive the parameters of a problem and generate propositional formulas from those parameters. The inference engine may then use propositional reasoning to determine the logical consequences of the formulas. Although the inference engine could perform propositional reasoning itself, the propositional reasoning function may be performed by a specialized component that responds to propositional reasoning requests from an inference engine. One reason for using such a specialized component is to simplify the design of the inference engine.

A "propositional reasoner" is a component that performs propositional reasoning. A propositional reasoner may be part of a problem solver and may respond to a request from an inference engine by performing propositional reasoning.

An "interface" is a component that handles transfer of signals between two other components. For example, an interface can handle the transfer of signals between an inference engine and a propositional reasoner.

These definitions provide a basis for understanding the invention.

B. General Features

Figure 2:
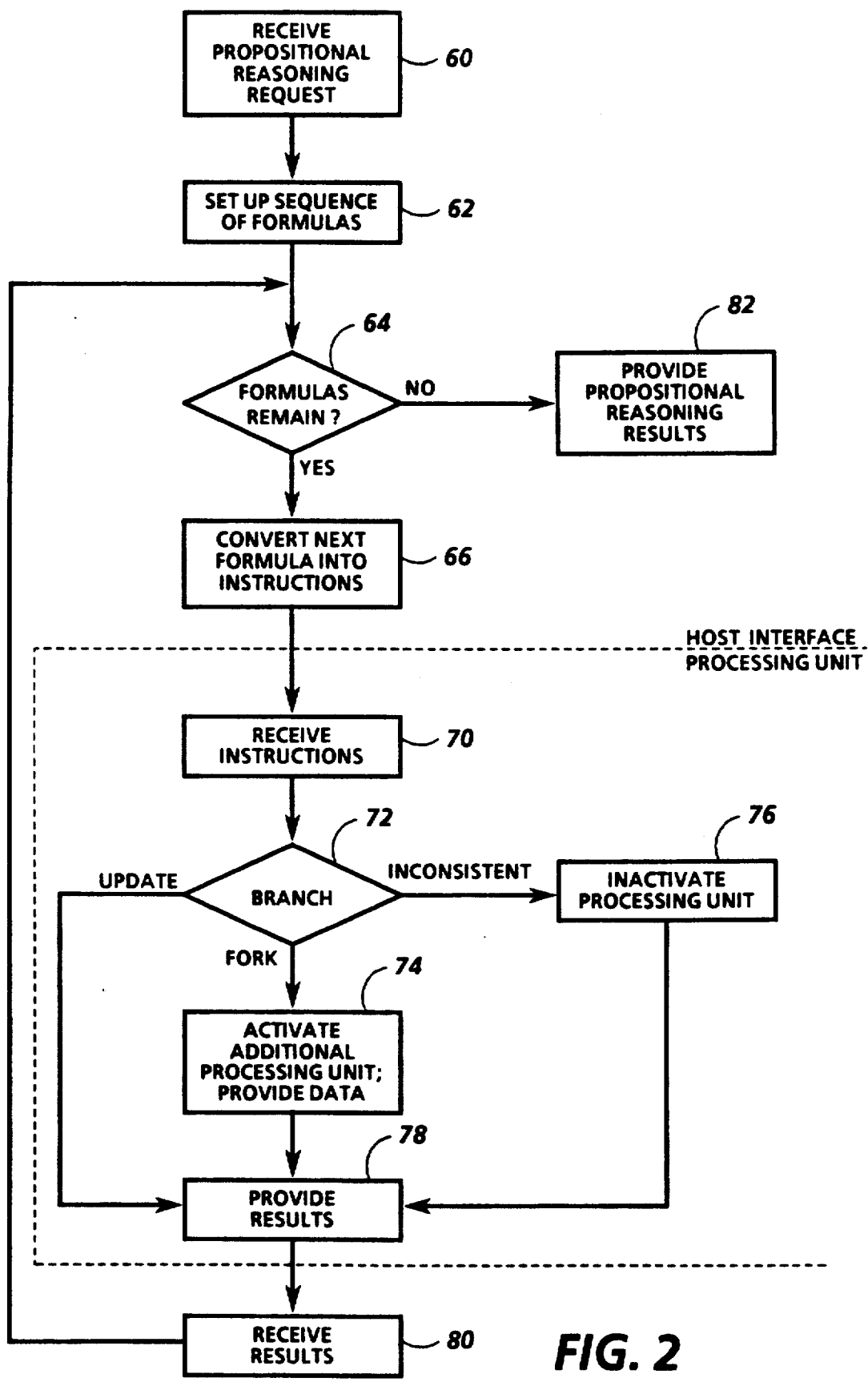
FIG. 2 is a flow chart showing general steps in the sequence of FIG. 1.
Figure 3:
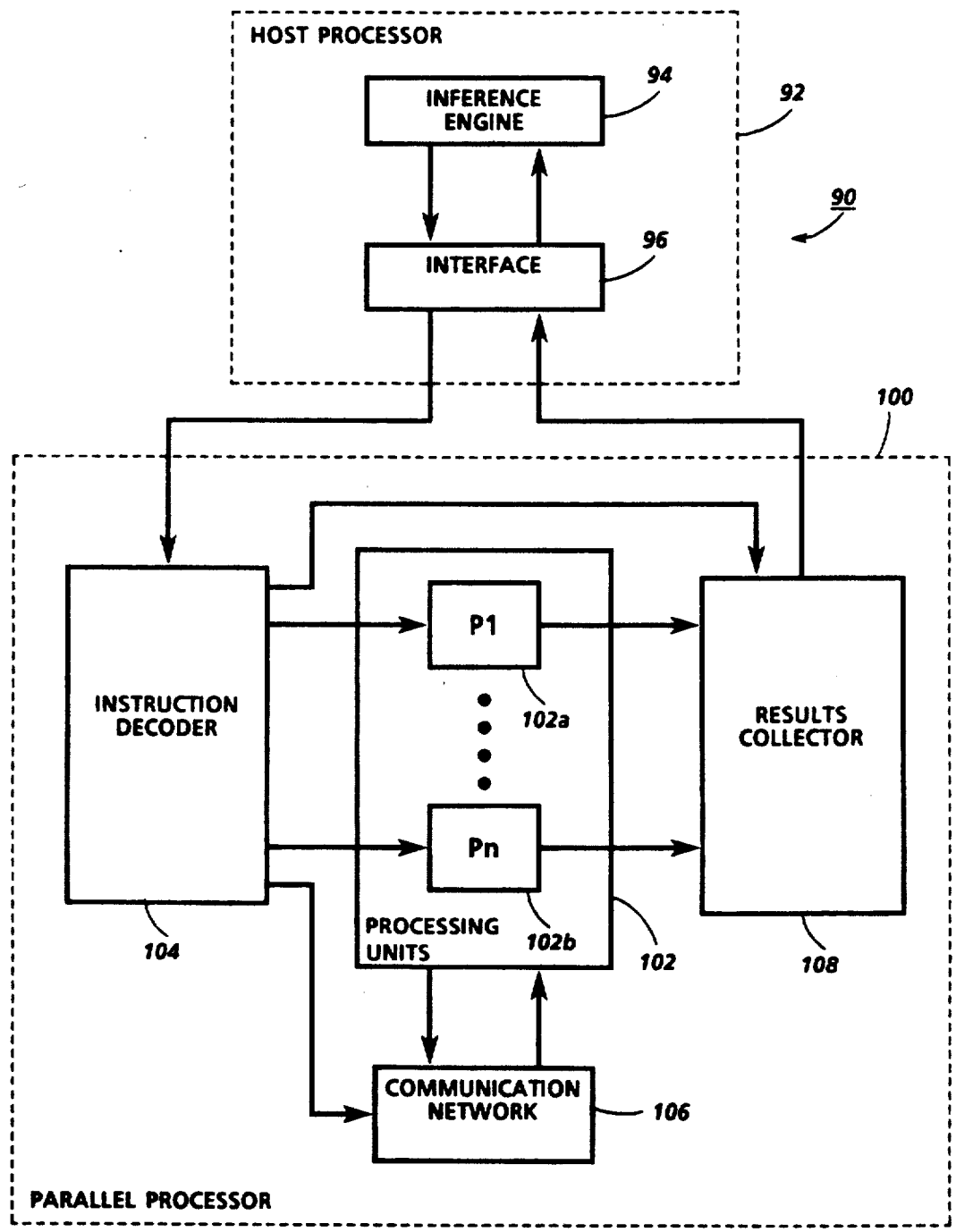
FIG. 3 is a schematic block diagram showing general functional components of a propositional reasoning system that could perform the steps in FIG. 2.

FIGS. 1-3 illustrate general features of the invention. FIG. 1 shows a simple example of parallel propositional reasoning. FIG. 2 shows general steps in providing propositional reasoning by handling each of a number of sets of element value combinations on a respective parallel processing unit. FIG. 3 shows components that provide propositional reasoning by performing the steps in FIG. 2.

The simple reasoning sequence illustrated in FIG. 1 determines the logical consequences of the two formulas (A ∨ B) and (∼B), where "∨" indicates weak or inclusive disjunction and "∼" indicates negation. These formulas are converted to instructions to parallel processing units to obtain their consequences.

The sequence starts in box 10 upon receiving the element A. Since A is a new element, two processing units are activated, P1 and P2. P1 is set up with a stored value indicating that A is true as shown in box 12, while P2 is set up with a stored value indicating that A is false as shown in box 14. This is the state of the parallel processor at the point in the sequence indicated by dashed line 16.

The next stage in the sequence occurs upon receiving the element B. Since B is also a new element, two additional processing units are activated, P3 and P4, each paired with one of the previously activated processing units. The values in P1 now indicate A and B are both true, in box 20; for P3, A is true and B is false, in box 22; for P2, A is false but B is true, in box 24; and for P4, both A and B are false, in box 26. This is the state of the processor at the point indicated by dashed line 28.

The next stage in the sequence results from an operator rather than a new element. The disjunction operator in the formula (A ∨ B) requires that at least one of A and B have the value true. Since it does not introduce a new element, no additional processing units are activated, but each of the currently activated processors determines whether its stored values are consistent with this operator. Processing units P1, P2, and P3 are consistent with it, as shown in boxes 30, 32, and 34, respectively. P4 is inconsistent with the disjunction of A and B, since its stored values were false for both A and B. Therefore P4 is inactivated as indicated in box 36. The state of the processor at the point indicated by dashed line 38 is that P1, P2, and P3 remain activated, while P4 is stopped.

The final stage in the sequence also results from an operator, the negation operator in the formula (∼B), which requires that B have the value false. Again, each of the currently activated processing units determines whether its stored values are consistent. Processing unit P3 is consistent, as shown in box 42. P1 and P2, however, are inconsistent, since each has the stored value true for B. P1 and P2 are inactivated as indicated in boxes 40 and 44. The final state of the processor is that P3 is activated with A true and B false, while P1, P2, and P4 are inactivated.

At the completion of the sequence of FIG. 1, the state of the processing units can be used to obtain logical consequences. For example, since processing unit P1 resulted in an inconsistency, its set of element value combinations implies an inconsistency. Those combinations can be described by the formula (A ∧ B), and the implication of inconsistency can be represented by the formula (A ∧ B)→⊥, where ⊥ represents a contradiction.

FIG. 2 shows explicitly several general steps involved in the propositional reasoning sequence of FIG. 1. Some of the general steps in FIG. 2 can be performed by a host processor, while others can be performed by a parallel processor through operations of each of its processing units, the latter steps being within the dashed line.

Propositional reasoning begins in box 60 upon receiving a request that includes a formula with which the results of a propositional reasoning task must be consistent. This request may originate in another routine executed by the host processor, or may originate from another processor. In box 62, an interface routine executed by the host processor sets up a sequence of formulas to perform the requested propositional reasoning. These formulas are based on the formula in the request, and may take any of a variety of forms, including simpler formulas based on the formula in the request. For example, in FIG. 1, the formula in the request was broken down into two simpler formulas, each of which was converted into instructions to the processing units.

In box 64, the interface routine begins an iterative loop in which it handles each formula in the sequence until no more formulas remain. If any of the formulas in the sequence have not yet been handled, the step in box 66 converts the next formula into a sequence of instructions to the parallel processor.

The parallel processor receives the instructions provided by the host processor, in box 70. As noted above, the parallel processor may include global instruction decoding or translation circuitry that provides signals causing each activated processing unit to execute each instruction, so that an activated processing unit in the parallel processor receives each instruction in the form of a decoded or translated signal. Then, in box 72, as a part of executing instructions, each activated processing unit branches based on the intermediate result it obtains. If the result indicates that an additional processing unit should be activated, shown by the word "fork" in FIG. 2, an additional processing unit is activated in box 74 and provided with data based on the stored data of the processing unit that obtained the fork result. Examples of forking were described above in relation to the first and second stages of FIG. 1. If the result is an inconsistency, the processing unit that obtained the inconsistent result is inactivated, in box 76. Examples of inactivation were described above in relation to the third and fourth stages of FIG. 1. In other cases, the result may indicate that no processor management operation is necessary, shown by the word "update" in FIG. 2. The processing units conclude their response to the instructions by providing results in box 78. These results may, for example, indicate whether the instructions were successfully executed.

The interface routine of the host processor receives the results from the parallel processor in box 80. Based on those results, the sequence of formulas to be handled may be modified before returning to handle the next formula in box 64. For example, if the results received in box 80 indicated that there were insufficient processing units to successfully handle a formula, that formula might be moved to the end of the sequence of formulas, to be handled again after the other formulas in the sequence. When all the formulas in the sequence have been handled, the interface routine provides the results of propositional reasoning to the routine that requested propositional reasoning, in box 82.

FIG. 3 shows system 90 with components that can perform the steps in FIG. 2. As indicated by the dashed line in FIG. 2, system 90 includes host processor 92, which may be a Symbolics Lisp Machine or a DEC Vax, and parallel processor 100, which may be a Connection Machine from Thinking Machines Corporation. Instead of running on a single serial processor, the components within host processor 92 could run on separate processors. The arrangement of FIG. 3 is exemplary of a current implementation, however, as discussed in greater detail below. Host processor 92 functions as a problem solver and also, with parallel processor 100, functions as a propositional reasoner.

The functions performed by host processor 92 include those of inference engine 94 and interface 96. Interface 96 receives requests for propositional reasoning from inference engine 94. Since there are many existing inference engines, e.g. Intellicorp's KEE, and each has a defined signal format for requesting propositional reasoning, interface 96 is preferably specialized to receive propositional reasoning requests in the format provided by inference engine 94. This means that inference engine 94 need not be modified for use with parallel processor 100; interface 96 handles the conversion of requests to a sequence of parallel processing instructions for parallel processor 100. Therefore, interface 96 and parallel processor 100 function together to provide parallel propositional reasoning.

Parallel processor 100 includes parallel processing units 102, illustratively including P1 processing unit 102a and Pn processing unit 102b. Instruction decoder 104 receives instructions from interface 96 and decodes them into appropriate signals to processing units 102. As an activated processing unit executes a propositional reasoning instruction in response to signals from decoder 104, it may obtain a result indicating that it should be inactivated or that an additional processing unit should be activated to handle part of its set of element value combinations. If activation of an additional processing unit is necessary, decoder 104 can, in response to an appropriate instruction, cause data from a previously activated processing unit to be provided to an additional processing unit through communication network 106. Similarly, in response to an appropriate instruction, decoder 104 can cause results collector 108 to collect the results of propositional reasoning and provide them to interface 96. Decoder 104 could provide a variety of other operations as well that would be useful, such as an operation in which each of a selected group of processors is assigned a unique integer in sequence. This operation could be used, for example, to pair each activated process with an inactivated processor.

Although the simple example discussed in relation to FIGS. 1–3 illustrates general features of the invention, it does not illustrate the power of the invention in handling propositional reasoning tasks involving a large number of elements. We turn now to consider a specific implementation that demonstrates this power.

C. ATMS/Connection Machine Implementation

The general features of the invention described in relation to FIGS. 1–3 could be implemented for a variety of applications, because propositional reasoning is an important component of many algorithms. For example, truth maintenance systems use propositional reasoning to record and control domain-specific reasoning processes in a domain-independent framework. Some other computational problems, such as constraint satisfaction, can be completely reformulated as a system of propositional statements that can then be turned over to a propositional reasoner. Propositional reasoning is also useful in machine vision, qualitative reasoning, parsing and other processing of natural language, diagnosis, design, and a host of other computational problems. The invention has currently been implemented for the Assumption-based Truth Maintenance System (ATMS), described briefly above, and can provide more than an order of magnitude speed improvement over serial implementations of ATMS.

The invention could similarly be implemented on a variety of machines. We have implemented ATMS on the Connection Machine of Thinking Machines Corporation, which is especially suitable because its massively parallel architecture allows simple operations to be performed in parallel over very large amounts of data. Implementation options and details of one implementation are set forth below, after an introduction to relevant features of ATMS, of the Connection Machine, and of the operations of a processing unit.

1. ATMS

The features of ATMS are set forth at length in the articles cited above and incorporated herein by reference. The serial version of ATMS is available as unsupported software from Xerox Corporation through Johan de Kleer, Xerox PARC, 3333 Coyote Hill Road, Palo Alto, Calif. 94304. We review here general features of ATMS that relate to its implementation on a parallel processor.

Figure 4:
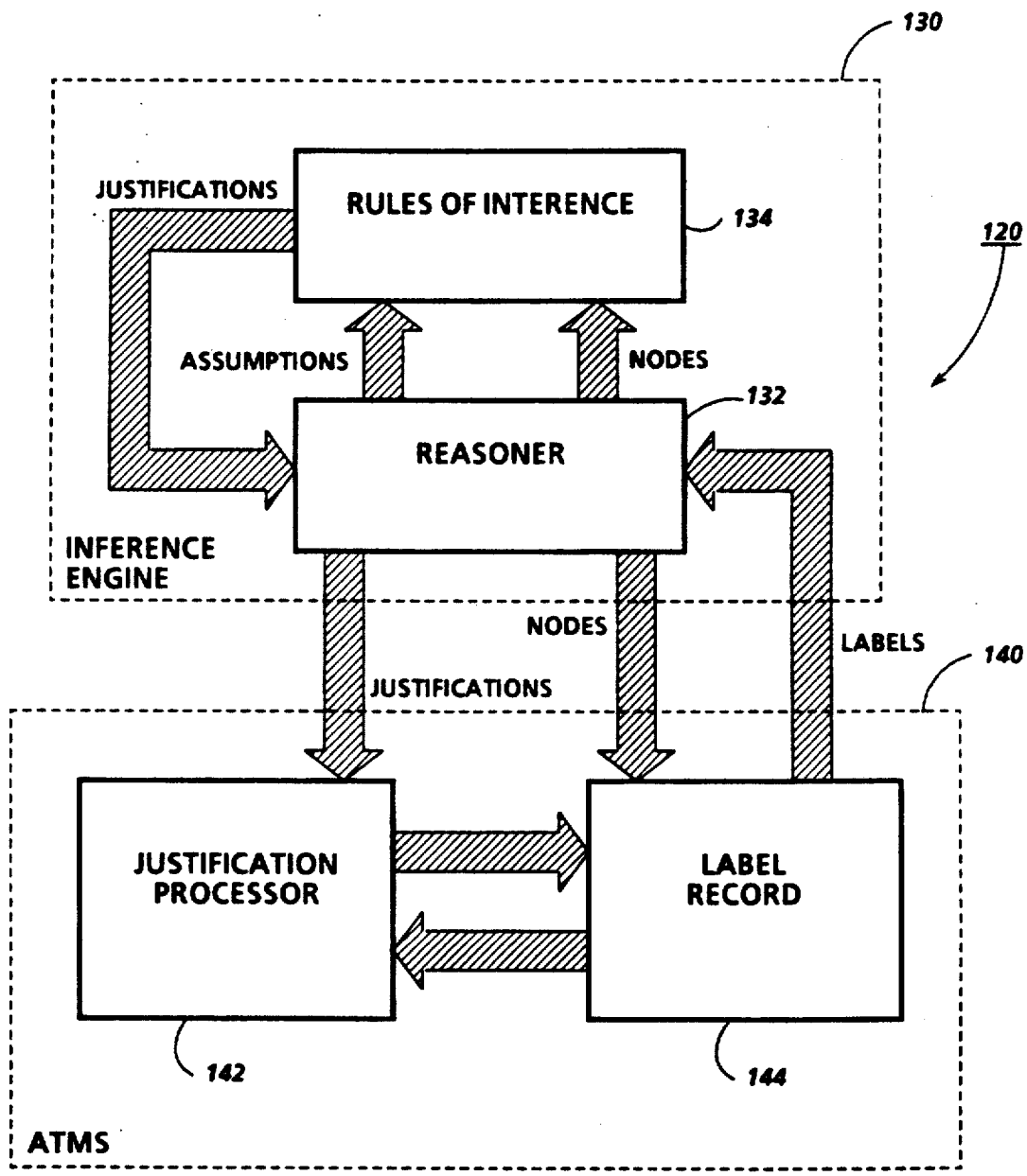
FIG. 4 is a schematic block diagram of functional components of a conventional ATMS implementation.

FIG. 4 shows the flow of information within system 120, illustrating graphically the operation of a conventional implementations of ATMS. System 120 includes inference engine 130, which may be the same as inference engine 94 in FIG. 3. The heart of inference engine 130 is reasoner 132, a process that attempts to reach a conclusion from a set of premises. In a problem solver, for example, reasoner 132 would be the main problem solving routine. Reasoner 132 may be viewed as performing two distinct functions: One function is to develop or expand the set of premises; the other is to resolve or reduce the set of premises. In developing the premises, reasoner 132 discovers implications and relationships from the internal structure of the premises. By resolving them, reasoner 132 identifies additional implications and inconsistencies among the premises considered as a whole. In the end, reasoner 132 reaches a conclusion based on the results obtained through developing and resolving the premises.

To perform the developing function, reasoner 132 employs inference rules 134. Although represented as a separate component in FIG. 4, inference rules 134 may be retrieved from memory by reasoner 132 and applied to the premises. As illustrated, the premises to which inference rules 134 are applied include both assumptions and nodes. Assumptions are independent binary choices, while nodes are binary choices that depend on the values of the assumptions. For example, in solving a problem, the assumptions may be a set of basic propositions that define all the possible partial solutions, each of which can be true or false independent of all the other assumptions. Each node, on the other hand, is a proposition whose truth depends on the truth or falsehood of one or more of the assumptions or of the other nodes.

Inference rules 134 operate on assumptions and nodes to obtain justifications, each of which is a proposition stating an implication from the logical conjunction of one or more premises, each referred to as an antecedent. Each of the antecedents is in turn an assumption or node. In conventional ATMS, the consequent of the implication can be either a node or a contradiction. More precisely, each justification may take one of the two forms:

$$l_1 \wedge l_2 \wedge \ldots \wedge l_m \rightarrow n$$

$$l_1 \wedge l_2 \wedge \ldots \wedge l_m \rightarrow \bot$$

where n is a node, $\bot$ represents contradiction, and each $l_i$ is a node, an assumption, or a negated assumption.

An inference rule may introduce a new node or assumption as the antecedent or consequent of a justification, so that inference rules 134 tend to increase the number of premises available for reasoning. Inference rules 134 may also reason from the internal structure of an assumption or node to obtain a justification, a powerful feature that tends to increase the information explicitly available for reasoning. On the other hand, inference rules 134 typically operate on a small number of assumptions and nodes of a particular form, and therefore seldom identify inferences or inconsistencies that emerge from a larger number of premises considered together.

To balance this weakness of inference rules 134, reasoner 132 requires a mechanism for considering a larger number of premises and identifying implications and inconsistencies. This resolving function can be performed by ATMS 140. As reasoner 132 provides a justification, justification processor 142 considers possible combinations of values of the antecedents of the justification. The number of possible combinations of antecedent values doubles in size with the introduction of each new assumption, so that the number of combinations can become very great if there are many assumptions. Justification processor 142 also applies the consequent of each justification, and if the consequent is $\bot$, justification processor 142 is able to identify inconsistencies. Application of a justification may therefore reduce the number of possible combinations of values through identifying inconsistent combinations.

ATMS 140 maintains in label record 144 a current representation of the set of antecedent value combinations that supports each node and inconsistency. Each of these representations is called a "label." Justification processor 142 may access label record 144 to retrieve the current label of a node that appears in a justification and may subsequently update a node's label based on the results of justification processing. If reasoner 132 requests the label of a node or of inconsistency, ATMS 140 provides the requested label from label record 144. Reasoner 132 can then perform further reasoning based on the label, which is in effect a minimal list of justifications of which the corresponding node is the consequent.

As a practical matter, quickly updating label record 144 so that is provides an efficient representation of each node's current label is the key to an effective serial implementation of ATMS. As discussed below, an implementation of ATMS on a parallel processor need not maintain each node's current label in this manner, because it can make the same information available through a single cycle operation. This can be a logical operation performed on a data field of each of the parallel processing units.

Figure 5:
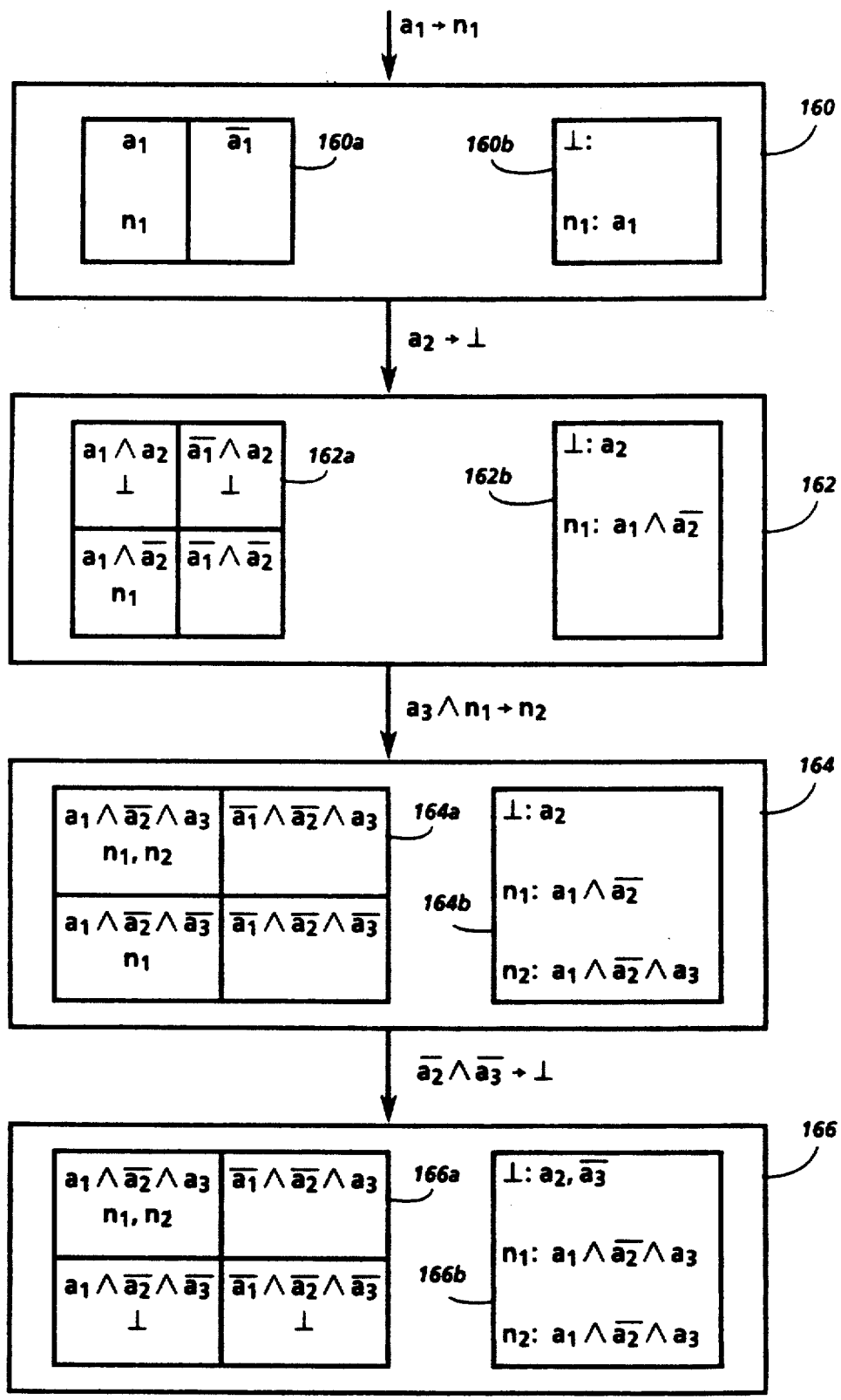
FIG. 5 is a sequential block diagram illustrating parallel ATMS operations according to the invention.

FIG. 5 illustrates a series of operations of an implementation of ATMS according to the invention, showing that justification processing is appropriate for execution on a parallel processor. Four stages of the operations are shown in boxes 160, 162, 164, and 166, each stage resulting from receiving a justification. Within each stage of the operations in FIG. 5, two states are shown. The state at left reflects the currently consistent combinations of assumption values, while the state at right reflects the combinations of assumption values that currently imply each node and inconsistency. The state at left is referred to herein as a state of "assumption space" because it is convenient to think of each combination of assumption values as an assumption point, with all assumption points defining an assumption space. In FIG. 5, only the state of the consistent part of assumption space is shown, the remainder of assumption space including those assumption points that imply inconsistency. The state at right in each stage is referred to as a state of the "extensions" of nodes and inconsistency, with the extension of a node meaning the subset of consistent assumption space that supports or implies that node, and the extension of inconsistency meaning all of the inconsistent assumption points.

Stage 160 occurs as a result of receiving the justification $a_1 \rightarrow n_1$. Implicit in stage 160 is an operation for creating a new assumption $a_1$. Assumption space 160a is shown subdivided into two subspaces, one for $a_1$ and one for its negation, $\sim a_1$. (For compactness, negation is shown in FIG. 5 with an overline rather than a tilde.) Each of these simple subspaces is referred to herein as an assumption point because it corresponds to an assignment of values to all currently existing assumptions. As implied above, an assumption point is referred to as consistent if the truth values of the assumptions at that point is consistent with the current justifications; it is inconsistent if the truth values and current justifications imply a contradiction. A new assumption can generally be created by dividing each consistent assumption point into two assumption points, associating with each of these assumption points an identifier of the new assumption and indicating for one assumption point the value true and for the other the value false. In stage 160, we start with two new assumption points, one with each value of the new assumption $a_1$.

Also implicit in stage 160 is an operation for creating a new node $n_1$ and applying the justification to obtain the new node's extension. These operations can be done by associating an identifier of the new node with each assumption point in assumption space that supports it, based on the data previously associated with that assumption point. As shown in assumption space 160a, $n_1$ is associated with assumption point $a_1$ in accordance with the justification. Extensions 160b indicate subsets of assumption points that imply each node or inconsistency. At this point, none of the assumption points imply inconsistency, but the extension of $n_1$ includes $a_1$, meaning that any assumption point at which $a_1$ is true implies $n_1$.

Stage 162 occurs after receiving the justification $a_1 \rightarrow \perp$. As in stage 160, a new assumption is created by subdividing each consistent assumption point in assumption space 162a into two assumption points, one for $a_2$ and one for its negative, $\sim a_2$. Then the justification is applied based on the data associated with each assumption point, so that an inconsistency identifier is associated with the assumption points at which $a_2$ is true, meaning that those assumption points need not be considered in subsequent operations. For the assumption point $a_1$ $a_2$, this inconsistency identifier overrides the identifier of $n_1$ that was previously associated with that assumption point. As a result, extensions 162b indicate that the extension of $\perp$ includes the subspace $a_2$ and that the extension of $n_1$ now includes only the assumption point $a_1 \wedge a_2$.

Stage 164 occurs after receiving the justification $a_3 \wedge n_1 \rightarrow n_2$. As in stages 160 and 162, each consistent assumption point from the previous stage is subdivided into two assumption points, one for each value of the new assumption $a_3$, in assumption space 164a. Then the new node $n_2$ is created and the justification is applied, so that an identifier of the new node $n_2$ is associated with each assumption point at which both $a_3$ and $n_1$ are true. As in the above stages, the justification can be applied based on the data associated with each assumption point. Extensions 164b now also indicate that the extension of the new node $n_2$ is $a_1 \wedge \sim a_2 \wedge a_3$.

Finally, stage 166 occurs after receiving the justification $\sim a_2 \wedge \sim a_3 \rightarrow \perp$. No new assumption points or nodes need be created. Applying this justification yields two inconsistent assumption points, with each of which is associated the inconsistency identifier in assumption space 166a. Extensions 166b indicate that the extension of $\perp$ now includes $\sim a_3$, and the extensions of $n_1$ and $n_2$ are both the same, $a_1 \wedge \sim a_2 \wedge a_3$.

As can be understood by comparing FIG. 5 with FIG. 1, the operations in FIG. 5 resemble the parallel operations described above in relation to FIG. 1. Each assumption point is a set of element value combinations, where each element is an assumption that may be either true or false. Therefore, each assumption point or a subset of assumption points can be handled by a respective processing unit of a parallel processor in the manner described in relation to FIG. 1. Operations equivalent to those in FIG. 5 could also be performed serially, of course, by conventional ATMS as shown in FIG. 4, but that would not provide the speed of a parallel processor.

We turn now to consider features of the Connection Machine.

2. The Connection Machine

The Connection Machine of Thinking Machines Corporation is a massively parallel processor in which thousands of simple processing units are connected by a communication network. Each processing unit has from 4K to 64K bits of memory. Each processing unit can emulate up to 64 processing units, each with a proportionally smaller amount of memory, so that a Connection machine with 16K processing units can have 1M virtual processing units, while one with 64K processing units can have 4M virtual processing units. One technique for doing so is described in Hillis et al, EP-A 237 218, incorporated herein by reference together with the related patent and applications incorporated therein by reference.

The Connection Machine processing units operate from a shared instruction stream and can execute from a very limited instruction set, described in *Connection Machine Parallel Instruction Set (PARIS): The Lisp Interface*, Release 2.7, Thinking Machines Corp., Cambridge, Mass., 1986, incorporated herein by reference. The instruction stream is provided by a conventional serial processor that acts as a host processor, and may be a Symbolics Lisp Machine, a DEC Vax, or a Sun workstation. Each instruction is decoded into signals provided to all the processing units. Although all the processing units share the instruction stream, not all need execute every instruction. In other words, some instructions are executed only by processing units with certain values stored in the memories. Furthermore, each processing unit's response to a given instruction depends on the data in its memory, so that the effect of many instructions is indirect. Based on the results of previous computations, a processing unit may be individually inactivated and later reactivated by modifying its stored data, so that it effectively skins the intervening instructions.

We turn next to the operation of a processing unit with the Connection Machine.

3. Processing Unit Operation

Figure 6:
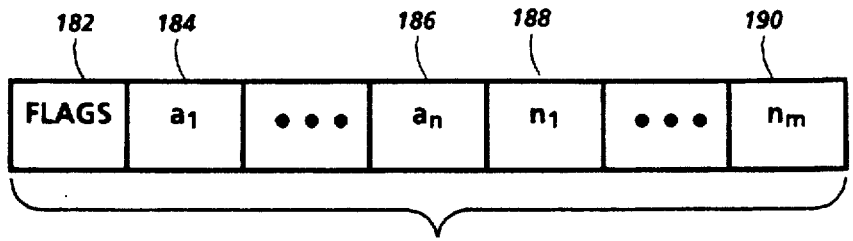
FIG. 6 is a schematic diagram illustrating fields in a parallel processing unit's memory during ATMS operations.

The Connection Machine can be treated as a large active memory, in which each processing unit is a memory location that can perform simple operations on the data it stores. FIG. 6 shows fields in data unit 180 for one processing unit in the Connection Machine. These fields correspond generally to the data associated with a subset of the assumption points in FIG. 5.

Flags field 182 includes a number of flags that are used by the processing unit in determining its status. For example, flags field 182 includes a context flag that indicates whether the processing unit is currently responding to a subset of the instruction set. Another activation flag may be used to indicate whether the processing unit is currently activated. As discussed at greater length below, a processing unit is activated as long as its subset of assumption points is consistent, so that the activation flag of a processing unit may be turned off if it has not yet been assigned a subset of assumption points of if its subset of assumption points is in the extension of inconsistency. The extension of inconsistency is, in effect, the complement of the assumption points corresponding to activated processing units. The activation flag is moved to the context flag when it is desired to direct an instruction only to processing units with consistent substeps of assumption points. Only flags in flags field 182 are similarly used to set the context flag or to perform other logical operations relating to selection and activation of each processing unit.

Fields 184 and 186 are the first and last of a series of assumption fields that includes one field for each of the assumptions $a_1 \ldots a_n$. The field corresponding to each assumption holds its value. As discussed further below, in one implementation on the Connection Machine each assumption may have one of three values—true, false, or indeterminate.

Fields 188 and 190 are the first and last of a series of node fields that includes one field for each of the nodes $n_1 \ldots n_m$. The field corresponding to each node indicates, for an assumption point, whether that assumption point is in the extension of that node.

In general, the field of data unit 180 need not be in any specific order within the processing unit memories, provided that the host processor keeps a record of the assignment of bit positions to each field. If a given field requires more than one bit position, the two bits may even be separated. As discussed in more detail, it may be advantageous to delay assignment of bit portions until necessary and to reclaim bit positions that are no longer needed.

A number of basic Connection Machine operations are available on the fields shown in FIG. 6, each with a number of variations. One operation combines two bit-fields within a processing unit's memory through a logical operator, and can be used to move the contents of one bit-field to another. Another global operation combines a bit-field of each of the processing units through a logical operator, and can be used to obtain results from all the processing units in a single cycle. Other operations can be used for bit-field transfer between processing units, and one such operation allows bit-field movement from any processing unit to any other processing unit through special purpose routing hardware within the Connection Machine's communication network.

We now consider a number of options for implementing ATMS on the Connection Machine, making use of these operations.

4. Implementation Options

One implementation of ATMS on the Connection Machine is described in some detail below. It is helpful, however, to review some of the implementation options as background to the description of that implementation. In general, a set of assumption points is handled by a respective processing unit of the Connection Machine, but the implementation options differ, for example, in how and when a set of assumption points is assigned to a processing unit.

a. Static Assumption Point Assignment

A simple option would be to statically assign each assumption point to a respective processing unit. Since the Connection Machine assigns processors binary addresses consecutively from zero, the truth value of assumption i on processing unit p could be the $i^{th}$ bit of p's address. In this option, each processing unit would also use on bit per node, including one bit for inconsistency, to represent whether or not the corresponding assumption point is in the node's extension.

In this option, a node's extension can be updated by a simple bit operation performed in parallel on all the processing units. This requires a one-cycle operation per antecedent on the Connection Machine. A global-OR operation can be used to determine whether a node's bit has changed for any of the processing units that is not in the extension of inconsistency.

This option would require $2^n$ processing units, where n is the number of assumptions. Adding an assumption doubles the number of processing units required, with each assumption point being separated into two and the two corresponding processing units having the same bits except for the new assumption. One way to do this would be to update the bits of all processing units not in use from the beginning of operations so that each will be ready when allocated to use.

In general, it is useful to be able to determine whether a node has any processing units in its extension. If it does, we refer to the node as being "in". Under this option, a node is in if and only if one of the processing units has its bit set and is not in the extension of inconsistency. The global-OR operation could be used to determine whether a node is in, but to retrieve the extension of a node that is in would require identifying the address of each such processing unit, which would require a time linearly proportional to the product of the number of assumptions with the number of assumption points in the extension.

This option has two drawbacks: The number of processing units required increases exponentially with the number of assumptions, which is impractical for problems with more than a small number of assumptions. Also, it may require a long time to determine the extension of a node, due to the linear relation noted above.

b. Consistent Assumption Points

This option can be used to reduce the number of processing units required. Rather than allocating processing units for all assumption points, this option allocates processing units only for consistent assumption points. For most problems, most assumption points are inconsistent, so that this option can reduce the number of processing units required substantially.

In this option, the values of assumptions and nodes are stored for each processing unit, since the values of the assumptions for a processing unit cannot be inferred from its address. A node's extension is retrieved by retrieving the assumption values of each processing unit whose bit for that node indicates that it is in the extension, a process that is linear like the corresponding process for the first option described above. When a processor corresponds to an inconsistent assumption point, it is temporarily inactivated, so that the extension of inconsistency is the complement of the assumption points of all the activated processors.

Creating an assumption in this option involves multiplying the number of activated processing units through a process called "forking." Each activated processing unit is paired with an inactivated processor, and its contents are copied to the inactivated processing unit, which is then activated. The new assumption is assigned the value true in one of the pair of processing units and the value false in the other. This processor allocation technique is a standard Connection Machine problem, to which the router circuitry of the Connection Machine is well suited. Several algorithms are known, as set forth in Hillis, W. Daniel, *The Connection Machine*, MIT Press, Cambridge, Mass. 1985, incorporated by reference herein. One implementation that has proved adequate is a very simple rendezvous algorithm with minimal memory requirements, which relies heavily on the router.

A technique for creating a new assumption according to this option can include the following steps: First, a bit position in each processing unit is allocated for the value of the new assumption, and that position is assigned the value true in each active processing unit. Then, an inactive processing unit is paired with each of the active processing units, and the contents of the active processing unit are copied into the paired inactive processing unit. The new assumption's bit position is then changed to the value false in each active processing unit, after which each of the paired inactive processing units is activated.

Similarly, a technique for updating the node extensions based on a formula such as a justification can include the following steps: Each active processing unit compares its bit position for each of the formula's antecedents to determine whether its bit has the correct value. If the bit for each antecedent has the correct value, the formula requires that the processing unit be in the extension of the consequent. If the formula's consequent is inconsistency, each processing unit that must be in its extension is inactivated. If the consequent is another node, each active processing unit that must be in its extension sets its bit for that node to true. The global OR operation can be used to determine whether any of the active processing units changed its bit for that node and, if so, the host processor performs additional steps for the formulas of which the consequent is an antecedent.

The key to the success of this option is to free enough processing units by applying formulas and discovering contradictions to cover the processing units that are necessary for adding new assumptions. The peak processor requirements determine whether or not a propositional reasoning task will run on a particular machine, so success depends heavily on the order in which operations are performed. Creating all the assumptions first is the worst possible order. It is better when creating a new assumption to apply each formula in which that assumption or its negation is an antecedent and ⊥ is the consequent; if the result for a given processing unit indicates that one or both of the results of forking would immediately result in inconsistency, that processing unit need not fork.

Even though this option reduces the number of processing units required, further reduction is possible.

c. Delayed Forking

This option further reduces the number of processing units required, and can also reduce the time required to determine the extension of a node. This option delays forking as long as possible, on a per-processing unit basis, to increase the chances both that contradictions discovered elsewhere will make more processing units available, and that a contradiction will be discovered in other choices this processing unit has made, eliminating the need to fork at all.

This option can be implemented by allocating a subspace of the assumption space to each active processing unit, with a subspace potentially including a number of assumption points. As mentioned above in relation to FIG. 6, each assumption's value can indicate true, false, or indeterminate. Therefore, the number of assumption points covered by an assumption space is $2^k$ where k is the number of assumptions with indeterminate values. The subspaces disjunctively cover all consistent assumption points, and a node's extension is a union of subspaces, while the extension of inconsistency is the complement of the union of all the subspaces. Therefore, all the assumption points in the subspace of a processing unit must be in the same nodes' extensions.

Initially, only a single processing unit is allocated, and the value of each assumption for its is indeterminate. Similarly, no additional processing units are needed when a new assumption is created, since each active processing unit can assign it the value indeterminate. A node can be created in the same manner as for the options described above, indicating with a bit (initially set false) whether each processing unit's subspace is in that node's extension. A node's extension can be retrieved base on the subspace of each active processing unit in its extension, which may be faster than for the other options because the number of subspaces to be retrieved may be substantially less than the total number of assumption points in the extension.

For this option, a processing unit must fork upon addition of a formula if its value for none of the antecedents is false but for some antecedent is indeterminate and the value for the consequent is not already true. When a processing unit encounters this situation, it pairs with a free inactive processing unit and copies its contents. Then the assignment of one of the indeterminate assumptions in the antecedent is changed to true in one of the paired processing units and to false in the other. Processing continues in the processing unit whose value for that assumption matches the antecedent, which is the processing unit that assigned the value true, if the antecedent was the assumption, or the processing unit that assigned the value false, if the antecedent was the negated assumption.

This option can be further improved if the processing unit tests whether it has reached the last indeterminate assumption in the antecedent of a formula whose consequent is inconsistency. If so, the fork can be avoided by forcing that assumption to the value opposite the antecedent, since the other value will be inconsistent.

The implementation discussed below makes use of this delayed forking option.

d. Reordering Formulas

This option reduces processing unit requirements by changing the order in which the formulas are applied. This option can apply formulas while inhibiting forking, so that a processing unit responds only if its values for all antecedents are determined, or if its value for an assumption is forced by the formula. Processing units that would fork in response to the formula do not respond, and if there are any such processing units, the formula is later reapplied, in which case further processing units may respond by inactivating or forcing a value. Eventually, however, all formulas must be completely processed, even by those processing units that must fork, in order to correctly obtain a node's extension. Forking need only be delayed for those processing units for which there are no available additional processing units to permit forking, so that the other processing units can continue. The implementation discussed below reorders formulas.

4. An Implementation

Appendix A is a code listing that can be run on the Connection Machine's host processor in order to implement an ATMS using the Connection Machine. The listing is in Common Lisp suitable for execution by a Symbolics Lisp Machine. In executing the functions in Appendix A, the host processor performs several different roles, including problem solver, propositional reasoner, and interface between the problem solver and the propositional reasoner. In its roles as interface and propositional reasoner, it provides instructions to the Connection Machine, each beginning with the prefix "cm:" in the code of Appendix A. The host processor thus manages the Connection Machine so that it performs propositional reasoning.

As a test and demonstration of the algorithm, Appendix A includes the function n-queens, which calls init-atms to boot the Connection Machine and to initialize a number of values. It then calls the function do-n-queens, which operates as a simple problem solver for the problem of placing a number N of non-attacking queens on an N by N chessboard, a problem that requires minimal problem-solver computation and a great deal of propositional reasoning. As discussed in greater detail below, do-n-queens provides a number of calls requesting propositional reasoning. Appendix A includes a group of functions that can be called by a problem solve such as do-n-queens in the same manner that the problem solver would request propositional reasoning of a conventional ATMS.

The implementation of Appendix A employs several techniques to reduce the number of processing units and the amount of memory space required for parallel propositional reasoning. After considering these techniques, we will examine several functions in Appendix A in greater detail. We will also consider a further technique that could be used to combine parallel and sequential propositional reasoning.

A. Resource Management Techniques

Figure 7:
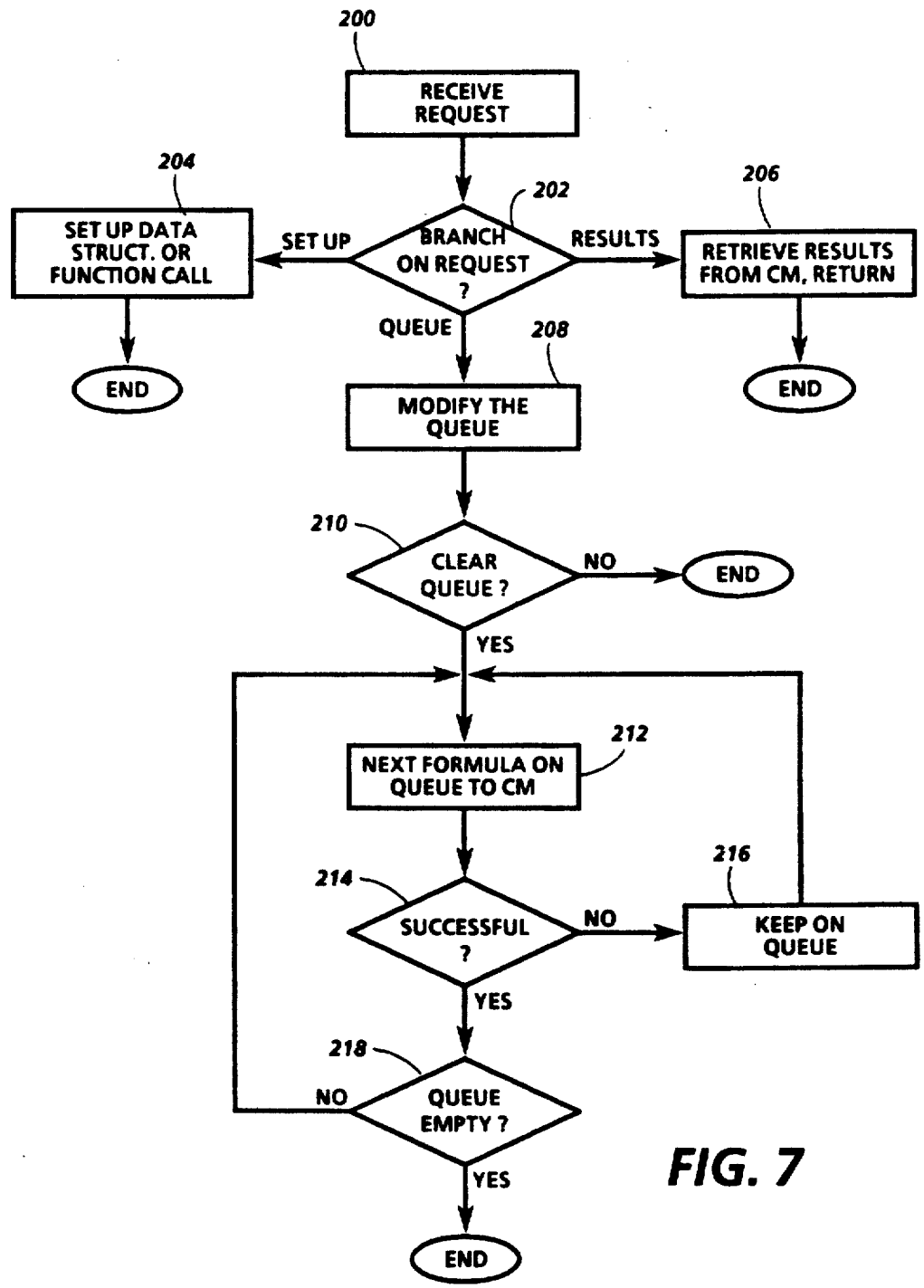
FIG. 7 is a flow chart showing general steps of an implementation of parallel ATMS according to the invention.
Figure 8:
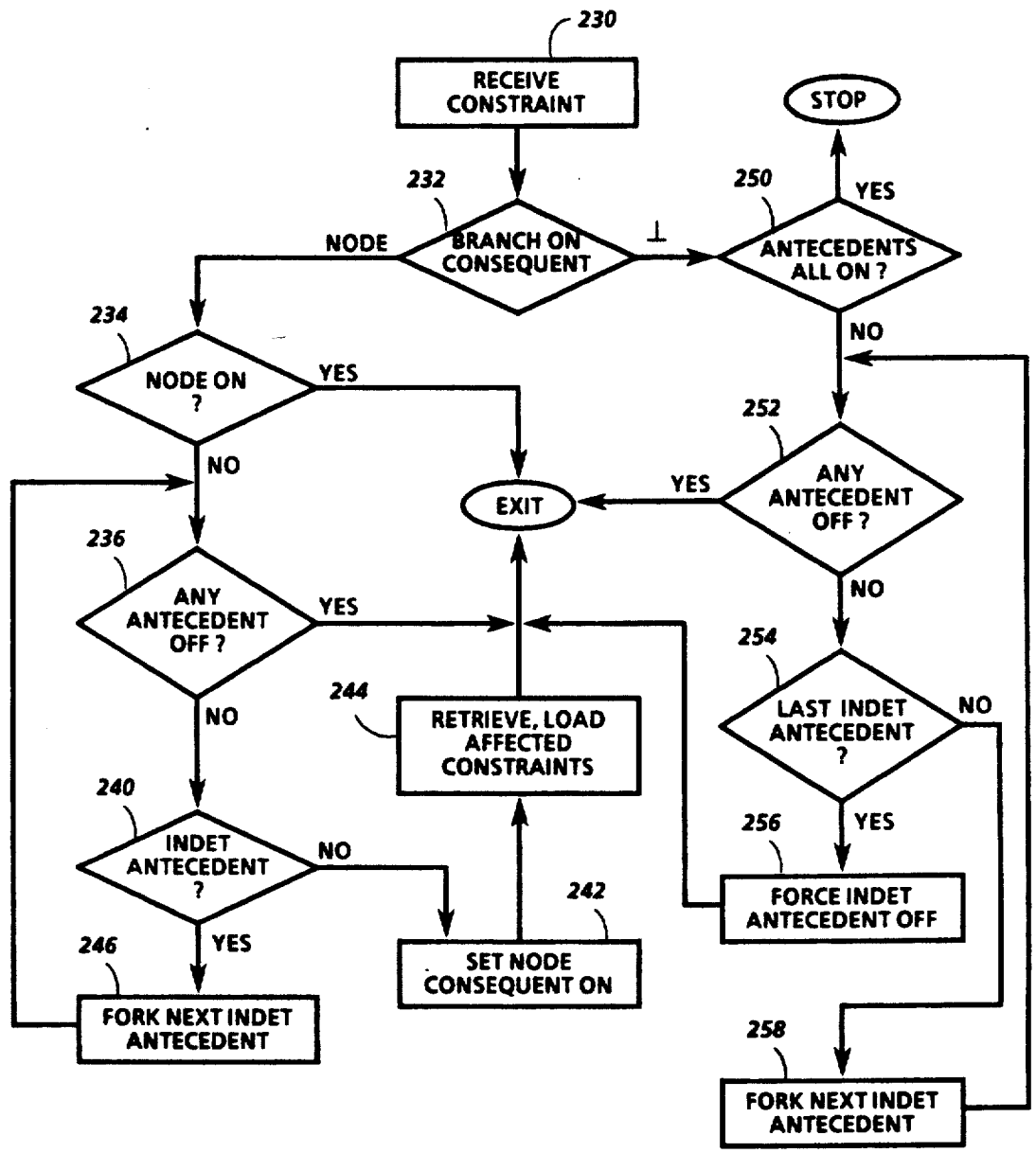
FIG. 8 is a flow chart showing general steps by which each processing unit in a parallel processor can delay forking according to the invention.
Figure 9:
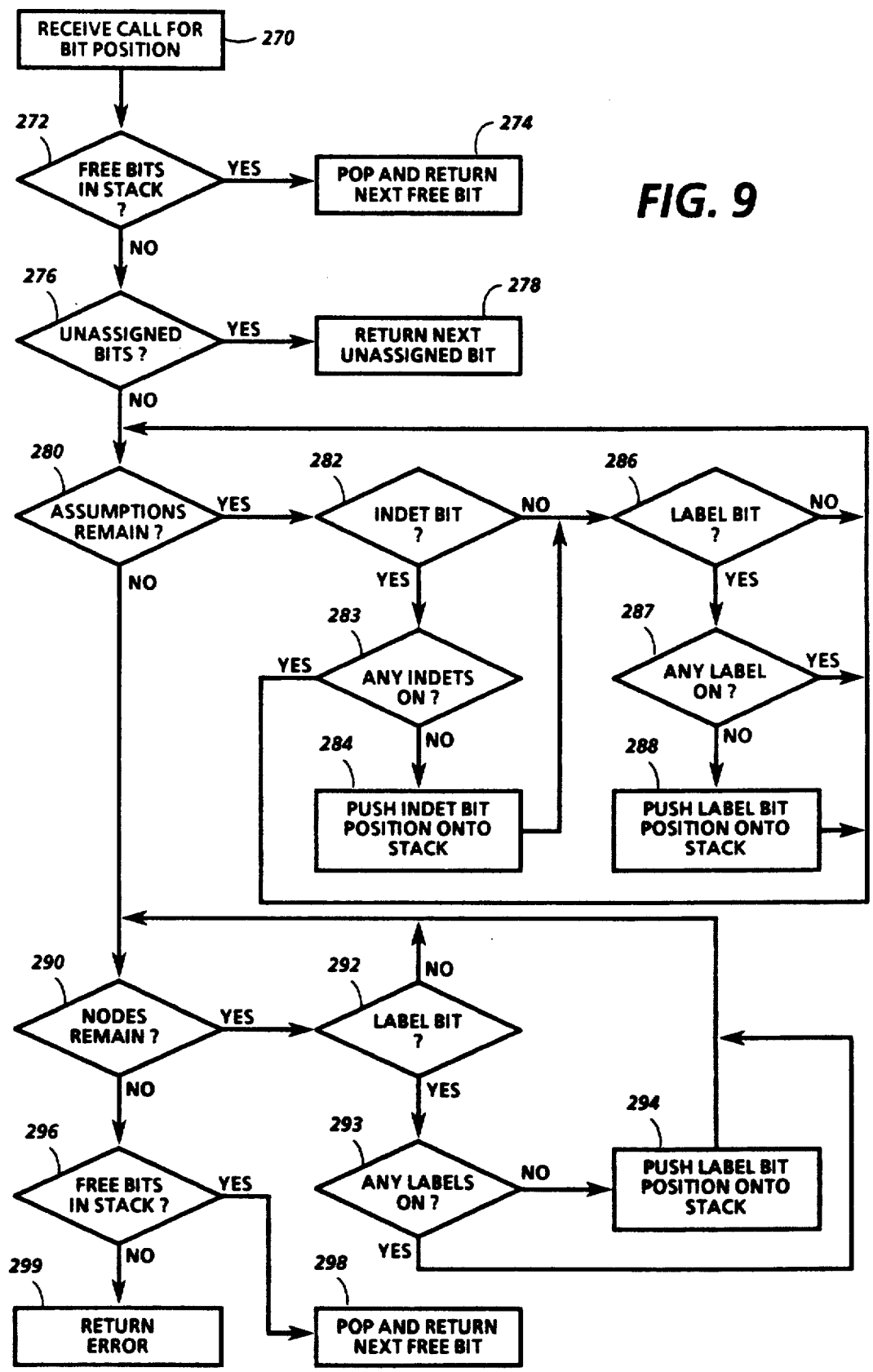
FIG. 9 is a flow chart showing steps in reclaiming memory bit positions.

Due to the limited number of processing units and the limited amount of memory space available to each processing unit in a parallel processor, an important part of parallel propositional reasoning is the management of these resources. FIGS. 7-9 illustrate several resource management techniques, some of which are based on implementation options discussed above.

FIG. 7 summarizes steps followed by the code in Appendix A in responding to requests for propositional reasoning; FIG. 7 illustrates the role of a queue, which helps reduce the processing units required by permitting formulas to be reordered and which provides flexibility in other ways. FIG. 8 shows general steps that implement the delayed forking option discussed above, another feature that reduces the processing units required. FIG. 9 illustrates general steps in assigning and reclaiming memory bit positions.

The sequence in FIG. 7 begins upon receiving a request for propositional reasoning, in box 200. The sequence then branches, in box 202, based on the nature of the request received. The steps in boxes 200 and 202 are not explicit in the code of Appendix A, but occur implicitly whenever a problem solver calls one of a number of functions. Each of the requests for propositional reasoning can be thought of as falling into one of three general categories—those that perform a set up function that typically does not involve the parallel processor; those that retrieve results of propositional reasoning; and those that relate to the contents of the queue discussed in more detail below.

Among the simplest functions a problem solver could call are those that perform various set up functions not affecting the queue nor involving instructions to the parallel processor. In Appendix A, for example, the function do-n-queens, calls the functions new-assumption, new-class, and n-new-classes to set up data structures. The function n-new-classes is an efficient way of calling new-class to set up a number of new class restriction data structures, each class restriction being a special type of formula that corresponds to a number of justifications. Other examples of set up functions are new-node, which sets up a node data structure, and attach-consumer, which sets up a function to be called as a consumer. A consumer is a special function that returns data to the problem solver without using one of the result retrieving functions discussed below, and is typically called in relation to a node when it becomes in, i.e. when it first has an extension. In response to a request falling one of these functions, the step in box 204 sets up the requested data structure or function call, thus completing the response to that request.

A problem solver could also call functions that retrieve the results of propositional reasoning from the parallel processor. Result retrieving functions in Appendix A include in?, true?, and get-label, none of which is called directly by do-n-queens. If a function in this category is called, the step in box 206 retrieves the appropriate results from the parallel processor and returns them to the calling function, completing the handling of that request.

Finally, a problem solver could call functions that relate to the contents of the queue, a data structure that is used in a technique for ordering formulas, including justifications and class restrictions, to reduce the number of processing units required. In response to a call to a function in this category, the queue is typically modified somehow, as shown in box 208. Then, the queue is typically cleared. The branch in box 210 indicates, however, that the queue may not be cleared, which may be appropriate if this function was called by another function that is already clearing the queue or if a valve is set indicating that clearing of the queue should be delayed.

In Appendix A, the function do-n-queens calls several queue related functions, including add-to-class, close-class, and run-through-queue. Other functions not called in executing do-n-queens also relate to the queue, including new-justification and run-class-constraints. Of these, the functions add-to-class, close-class, new-justification, and run-class-constraints all include modifying the queue, as in box 208, and may always clear the queue. The function run-through-queue, on the other hand, does not modify the queue but always clears the queue, so that do-n-queens calls run-through-queue as its final step after completing all functions that modify the queue.

In clearing the queue, the step in box 212 provides the next formula on the queue to the parallel processor through a sequence of instructions to the processing units. If the test in box 214 determines that the parallel processor cannot successfully handle the formula, typically because of inadequate processing units to perform all required forking, the formula is kept on the queue in box 216, and the next formula on the queue is attempted by returning to box 212. If the parallel processor successfully handles the formula, the test in box 218 then determines whether the queue is empty. If not, the sequence returns to handle the next formula in box 212, finally ending when the queue is empty. Also, if the sequence goes through all the formulas currently on the queue without successfully handling any of them, the sequence will end and indicate an error.

The steps in boxes 212-218 in FIG. 7 put the formulas on the queue into an order through trial and error. As noted above, the typical reason for failure of a parallel processor to handle a formula is that not enough free processing units are currently available to perform all required forking. When this occurs, the formula is moved off the head of the queue, but kept on the queue. The next time it reaches the head of the queue, the number of free processing units may be sufficient to handle it. This may occur because other formulas have increased the number of free processing units or have decreased the number of additional processing units needed to handle that formula. Thus the queue provides a way to order a number of formulas applied in propositional reasoning to reduce the number of processing units required to handle them. The queue also permits a flexible technique for handling consumers, mentioned above.

FIG. 8 illustrates general steps underlying delayed forking, discussed above, another technique that can reduce the number of processing units required. None of the functions in Appendix A follows precisely the steps in FIG. 8, but the functions in Appendix A can be understood based on FIG. 8. In general, the steps of FIG. 8 apply to a single processing unit in the Connection Machine, although many of them are performed globally by the host processor.

The sequence of FIG. 8 begins upon receiving a constraint from the queue, in box 230. As noted above, the formulas applied in the implementation of Appendix A include not only justifications, but also class restrictions. In principle, this permits the handling of any well-formed propositional formula through the queue, because every well-formed formula can be converted to an equivalent justification or set of justifications. We use the term "propositional constraint" or simply "constraint" herein to include a justification or a class restriction, the two types of formulas that can be on the queue of Appendix A. The code of Appendix A could be extended to handle other types of formulas, but in general a formula should be of a type that is appropriate to the operations being performed on it, so that not all types of formulas would be equally useful in an implementation of parallel propositional reasoning.

The branch in box 232 depends on the consequent of the constraint, which, in FIG. 8, may either be a node or ⊥. The code in Appendix A also allows the consequent to be an assumption, but, as noted above, the consequent of each justification is conventionally a node or ⊥, and these are typically the only consequents that occur. Each class restriction is equivalent to a set of justifications, each of whose consequent is ⊥, so the handling of a class restriction resembles the handling of a justification whose consequent is ⊥.

Each constraint requires in effect that the extension of its consequent must include the intersection of the extensions of its antecedents. It is convenient for this purpose to think of the extension of an assumption as including all consistent assumption points at which it has the value true, while the extension of its negation is all consistent points at which it is assigned the value false.

If the consequent is a node, the test box 234 determines whether a bit position has been assigned for the value of that node and, if so, whether the node is on, meaning its bit position has the same value as the node has in the constraint. In Appendix A, each node can thus have three possible values; no bit position assigned, which means none of the processing units are in the node's extension; bit position on, indicating this processing unit is in the node's extension; and bit position off, indicating this processing unit is not in the node's extension. If the node is on, there is no need for this processing unit to perform further processing in relation to this constraint—it is consistent with the constraint, regardless of the values it has for the antecedents. Therefore, this processing unit exits from the currently operating processing units, although it remains activated for subsequent constraints.

If the node is not on, it may be necessary to fork one or more of the antecedents. Before doing so, the test in box 236 determines whether any of the antecedents are off, an antecedent being off if its stored value is inconsistent with the value it has in the constraint. The values of a node are described above. In Appendix A, each assumption can have more values, because as many as two bit positions, label and indet, can be assigned to an assumption; if label is not assigned, the assumption is determinate and false in all processing units; if label is assigned but indet is not, the assumption is determinate in all processing units and label indicates whether it is on or off; if both are assigned and indet is on, the assumption is indeterminate; and if both are assigned and indet is off, label indicates whether the assumption is on or off. The code in Appendix A assumes in effect that each antecedent is an assumption, a negated assumption, or a node, as in a conventional ATMS. If the test in box 236 determines that any of the antecedents is determinate and has a different value than its value in the constraint, then this processing unit cannot be in the extension of the consequent of the constraint, so that this processing unit exits.

If none of the antecedents are off, the test in box 240 then determines whether any of the antecedents is an indeterminate assumption. If not, all of the antecedents are on, meaning that each is determinate and has the same value as its value in the constraint. Therefore, the step in box 242 set the node consequent on, which may include assigning a bit position for its value if none has been previously assigned. Because this changes the extension of that node, the step in box 244 then retrieves and loads onto the queue any constraints of which that node is an antecedent, because the extensions of their consequents may also be affected. Then, since this processing unit now has the consequent on, it exits just as it would have from the test in box 234.

If any of the antecedents is an indeterminate assumption, it can be forked between the two possible values of its label bit position. The step in box 246 therefore forks by pairing this processing unit with a free processing unit, copying this processing unit's data into the paired processing unit, and setting each determinate value of the assumption in one of the pair. The sequence of FIG. 8 then returns to the test in box 236, in response to which one of the paired processing units exits because that antecedent assumption is off for it. The loop in boxes 236, 240 and 246 continues until all the indeterminate antecedents have been forked in this manner, at which point all of the processing units will have exited and any processing unit that could be in the extension of the consequent node will have the node on.

The steps when the consequent of a constraint is ⊥ are somewhat different, in part because a processing unit with all the antecedents on is inactivated to remove it from the extensions of any nodes and to include it in the extension of inconsistency. Therefore, the test in box 250 determines whether all the antecedents are on, meaning that each is determinate and has the same value as in the constraint. If so, the processing unit is inactivated and can subsequently be used for a different set of assumption values.

If not all the antecedents are on, the test in box 252 determines whether any of the antecedents are off. If so, the constraint is inapplicable to this processing unit in the sense that this processing unit is consistent with the constraint. Therefore, the processing unit exits and remains activated.

If the constraint could be applicable, there must be at least one indeterminate antecedent assumption. The test in box 254 determines whether there is only one such antecedent, because if there is, that antecedent can only be off in order to keep this processing unit consistent with the constraint. If this is the last indeterminate antecedent, the step in box 256 forces that antecedent to be determinate with the value inconsistent with its value in the constraint, and then this processing unit exits, remaining activated.

If the last indeterminate antecedent has not been reached, the step in box 258 forks the next indeterminate antecedent, and one of the two forked processing units exits as a result of the test in box 252, since it will have an antecedent that is off.

The technique of FIG. 8 can greatly reduce the number of processing units required to handle a constraint with the consequent ⊥. For example, if a processing unit has three indeterminate antecedents for such a constraint, the technique of FIG. 8 will require at most two additional processing units to handle that constraint, while forking on each indeterminate antecedent would require seven additional processing units.

For some problems, the number of processing units required may exceed those available even if the techniques of FIGS. 7 and 8 are employed. Propositional satisfiability, an NP-complete problem, if encoded with one assumption for each variable and one justification for each clause, could require exponentially many processors. Therefore, it may be necessary to develop further techniques for reducing the number of processing units required.

The number of processing units is not the only limitation imposed by the architecture of the Connection Machine. As noted above, there is a tradeoff between the number of processing units, including emulated processing units, and the amount of memory space available to each processing unit. FIG. 9 shows a sequence of steps used in the code of Appendix A to reclaim unused bit positions in the memory of each processing unit.

The sequence of FIG. 9 begins upon receiving a request for a new bit position, occuring when the function new-pos is called, in box 270. The test in box 272 determines whether a free bit stack is storing any previously assigned bit positions that have subsequently become free. If so, the step in box 274 pops the next free bit position from the stack and returns it to the function that called new-pos.

If the free bit stack is empty, the test in box 276 determines whether any of the bit positions are still unassigned. If so, the step in box 278 returns the next unassigned bit position to the function that called new-pos.

If the free bit stack is empty and all the bit positions have been assigned, it is necessary to reclaim a bit position, if possible. This is done both for the assumptions and for the nodes that have been created.

The iterative loop that begins with the test in box 280 reclaims bit positions previously assigned to assumptions, by handling all of the assumptions that have been created. If any assumption remains to be handled, the test in box 282 determines whether an indet bit position is currently assigned for the next assumption. If so, the test in box 283 determines whether any of the processing units has the indet bit on for that assumption. If not, the assumption is determinate in all the processing units, so that the indet bit is unnecessary. The indet bit position is pushed onto the free bit stack in box 284. But if the indet bit is on for some processing unit, the indet and label bit positions are both necessary, so the loop returns to box 290. Similarly, the test in box 286 determines whether a label bit position is currently assigned for the next assumption. If so, the test in box 287 determines whether any of the processing units has the label bit on for that assumption. If not, the assumption is false for every processing unit, so that the label bit in unnecessary. The label bit position is pushed onto the free bit stack in box 288.

The iterative loop that begins with the test in box 290 reclaims bit positions previously assigned to nodes, by handling all of the nodes that have been created. If any node remains to be handled, the test in box 292 determines a label bit position is currently assigned for the next node. If so, the test in box 293 determines whether any of the processing units has the label bit on for the next mode. If not, the node has an empty extension, so that the label bit is unnecessary. The label bit position is pushed onto the free bit stack in box 294.

When all the assumptions and nodes have been handled, the test in box 296 determines whether the free bit stack includes any free bit positions. If so, the step in box 298 pops the next free bit position and returns it to the function that called new-pos. But if the stack is still empty, there are no bit positions available to respond to the request, so the step in box 299 returns a signal indicating an error condition.

The techniques described above in relation to FIGS. 7-9 are important because they reduce requirements for processing units and for memory space. Without such techniques, it would be difficult to implement an ATMS or other propositional reasoner on a Connection Machine or other massively parallel processor to handle a problem with a large number of assumptions. We turn now to other features of the implementation of Appendix A.

B. General Functions

In addition to illustrating the use of the queue in resource management, FIG. 7 illustrates how calls for propositional reasoning are handled. Several functions in Appendix A implement steps in FIG. 7. We will examine function that modify the queue, as in box 206; functions involved in clearing the queue, as in boxes 212-218; and functions that retrieve results as in box 204.

Some of the functions that modify the queue are described briefly above in relation to box 206 in FIG. 7. In order to understand how the queue is cleared, however, it is helpful to know more about the formulas that can be loaded on the queue. As implemented in Appendix A, the queue can include formulas of two types, referred to herein as propositional constraints—justifications and class restrictions. These two types of constraints can appear in any order in the queue.

Each justification, as described above, includes antecedents and a consequent. Each antecedent is conventionally an assumption, a negated assumption, or a node, while the consequent is conventionally either a node or ⊥. When the problem solver requests that the interface handle an assumption or node, by calling the functions new-assumption or new-node, the interface creates an assumption or node data structure. Subsequently, when the problem solver requests that the interface handle a justification through a call to the function new-justification, the interface creates a justification data structure that lists the antecedents and consequent of the justification. The function new-justification also calls the function careful-enqueue, which loads the newly created justification onto the queue.

Each class restriction is a compact way of representing a large set of justifications, each of whose consequents is ⊥. Each class restriction is one of three types: If it is closed, then at least one of its members must be on. If it is exclusive, then at most one of its members is on. If it is both closed and exclusive, then exactly one of its members is on. The problem solver can modify the members of a class restriction by calling the function add-to-class, for example, indicating a class restriction and an assumption or node to be added as a member. Similarly, the problem solver can call the function close-class, which may set a value indicating the class restriction is closed. Each of these functions, if appropriate, ends with a call to the function careful-enqueue, which loads the class restriction onto the queue.

Figure 10:
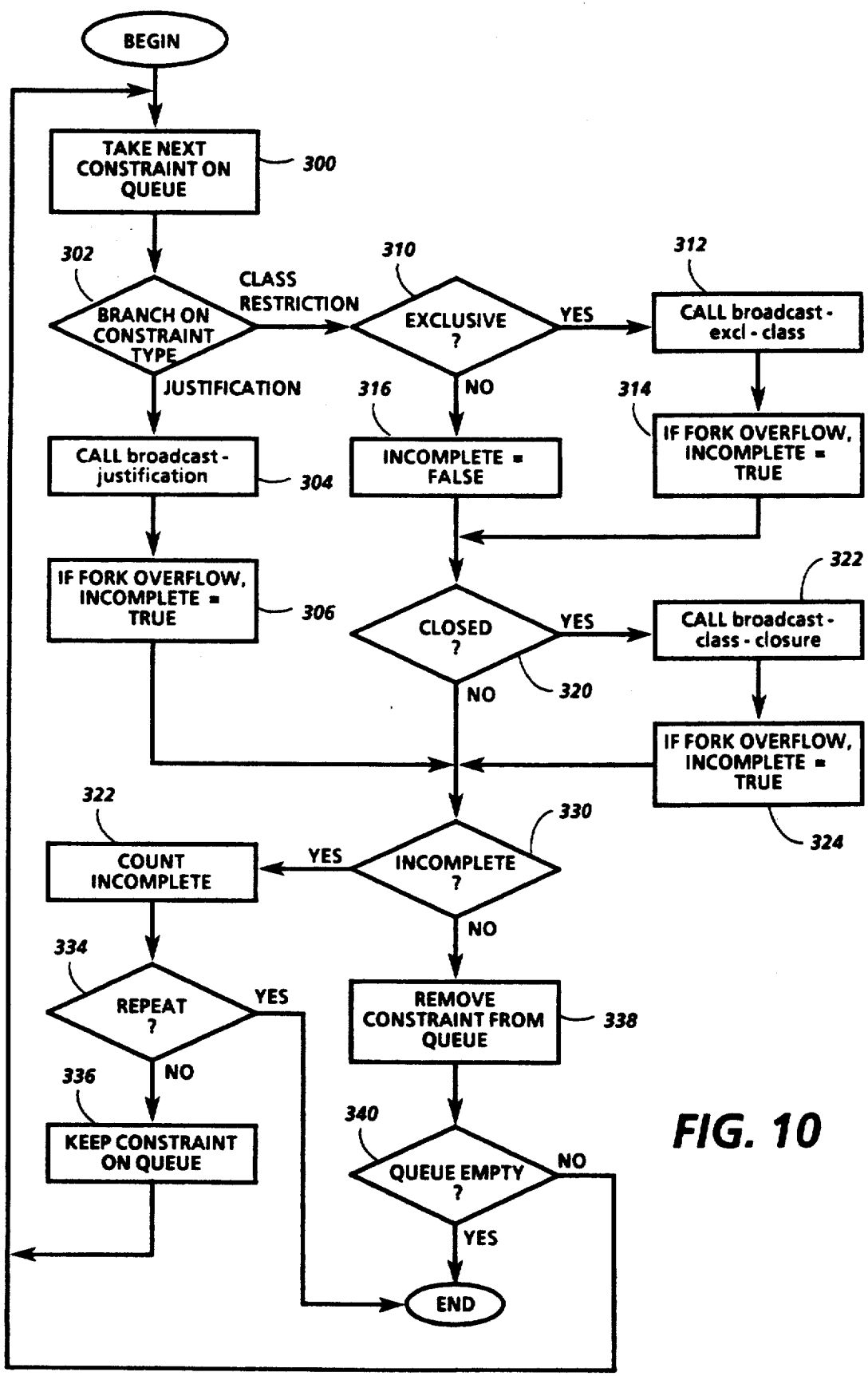
FIG. 10 is a flow chart showing steps for clearing the queue in FIG. 7.

When appropriate, careful-enqueue calls the function clear-queue to handle the constraints on the queue. Another function that calls clear-queue is run-class-constraints. FIG. 10 shows steps by which clear-queue goes through the queue when called.

The function of FIG. 10 begins with the next constraint on the queue, in box 300. The step in box 302 branches based on whether that constraint is a class restriction or a justification. In either case, the function attempts to handle the constraint by providing instructions to the parallel processor, as discussed below. The functions that provide these instructions to the parallel processor are called broadcast functions, because calling one of the broadcast functions in relation to a constraint results in a sequence of instructions that causes each currently activated processing unit to determine whether its subset of assumption points is consistent with that constraint or should be forked based on that constraint. In effect, the constraint is broadcast to all of the activated processing units. Each of the broadcast functions includes some of the features described above in relation to FIG. 8. The broadcast functions are described in greater detail below.

If the next constraint is a justification, the function attempts a broadcast of that justification by calling the function broadcast-justification in box 304. The step in box 306 sets a variable Incomplete based on the result of the broadcast in box 304. Incomplete is true only if forking overflowed, meaning that there were not enough processing units to complete forking, in which case the broadcast is incomplete and should be performed again.

In contrast to a justification, the broadcast functions for a class restriction depend on whether the class restriction is exclusive or closed or both. The test in box 310 determines whether the class restriction is exclusive. If so, the step in box 312 calls the function broadcast-excl-class to broadcast the class restriction. The step in box 314 sets Incomplete true if forking overflowed during the broadcast in box 312. If the class restriction is not exclusive, the step in box 316 sets Incomplete false. The test in box 320 determines whether the class restriction is closed. If so, the step in box 322 calls the function broadcast-class-closure. The step in box 324 sets Incomplete true if forking overflowed during the broadcast in box 322.

After broadcasting has been attempted, the test in box 330 determines whether it succeeded based on Incomplete. In Incomplete is true, indicating that forking overflowed in one of the broadcast functions, the step in box 332 counts the number of times Incomplete has been true for this constraint. If the test in box 334 determines that broadcast of this constraint has failed more than once in succession, this means that the function has gone through the entire queue without successfully broadcasting any of the constraints. In that case, there is no point in continuing, so the function ends. But if this is not a repeated failure, the step in box 336 keeps the constraint on the queue, moving it to the end, and returns to the step in box 300 to try broadcasting the next constraint that is now at the head of the queue. If Incomplete is false, indicating a successful broadcast, the step in box 338 removes the constraint from the queue and also resets Incomplete and the count of Incompletes for all the constraints. If the test in box 340 determines that the queue is empty, the function ends. Otherwise, it returns to the step in box 300 to handle the next constraint on the queue.

Figure 11:
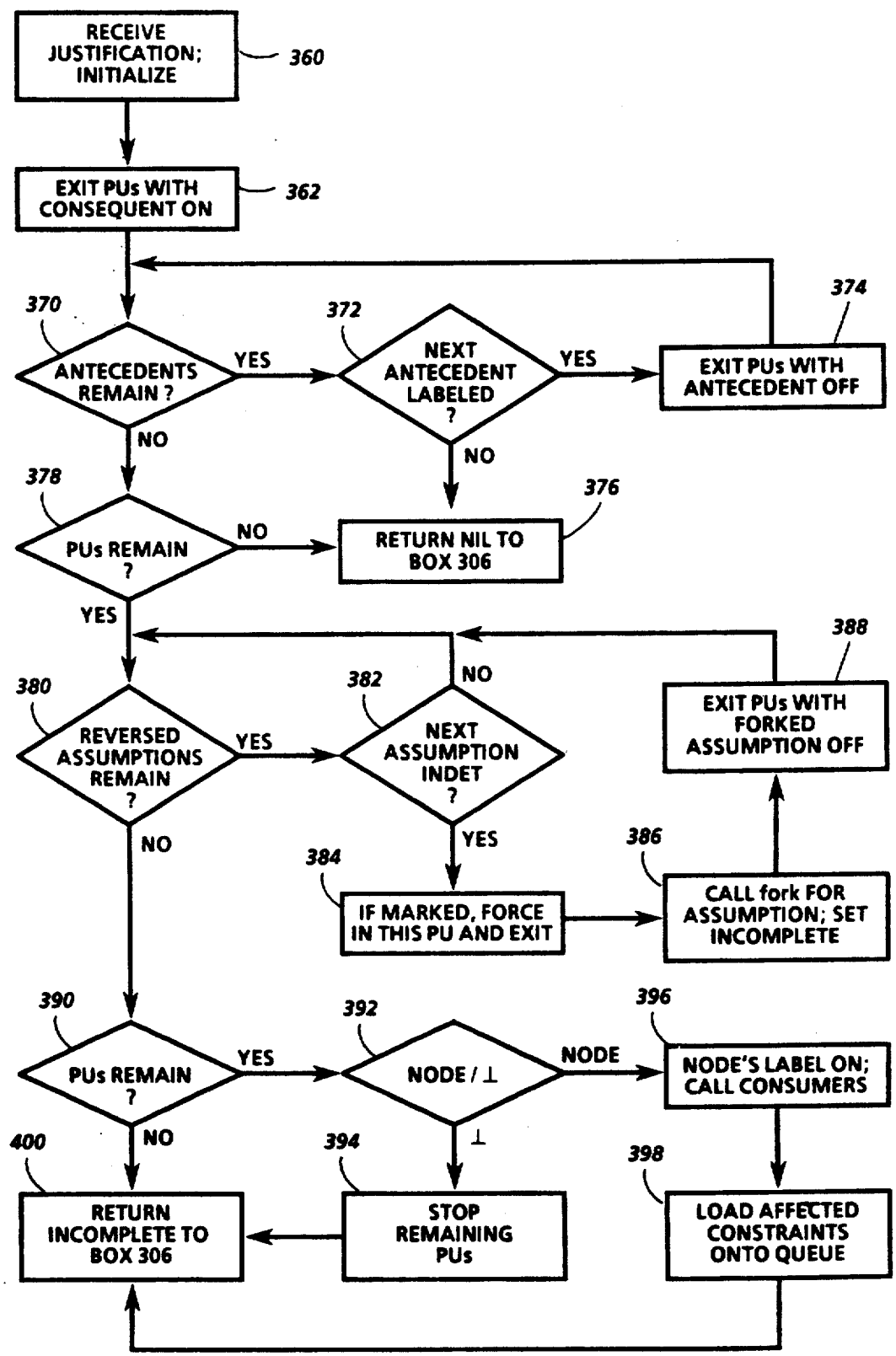
FIG. 11 is a flow chart showing steps for broadcasting a justification in FIG. 10.
Figure 12:
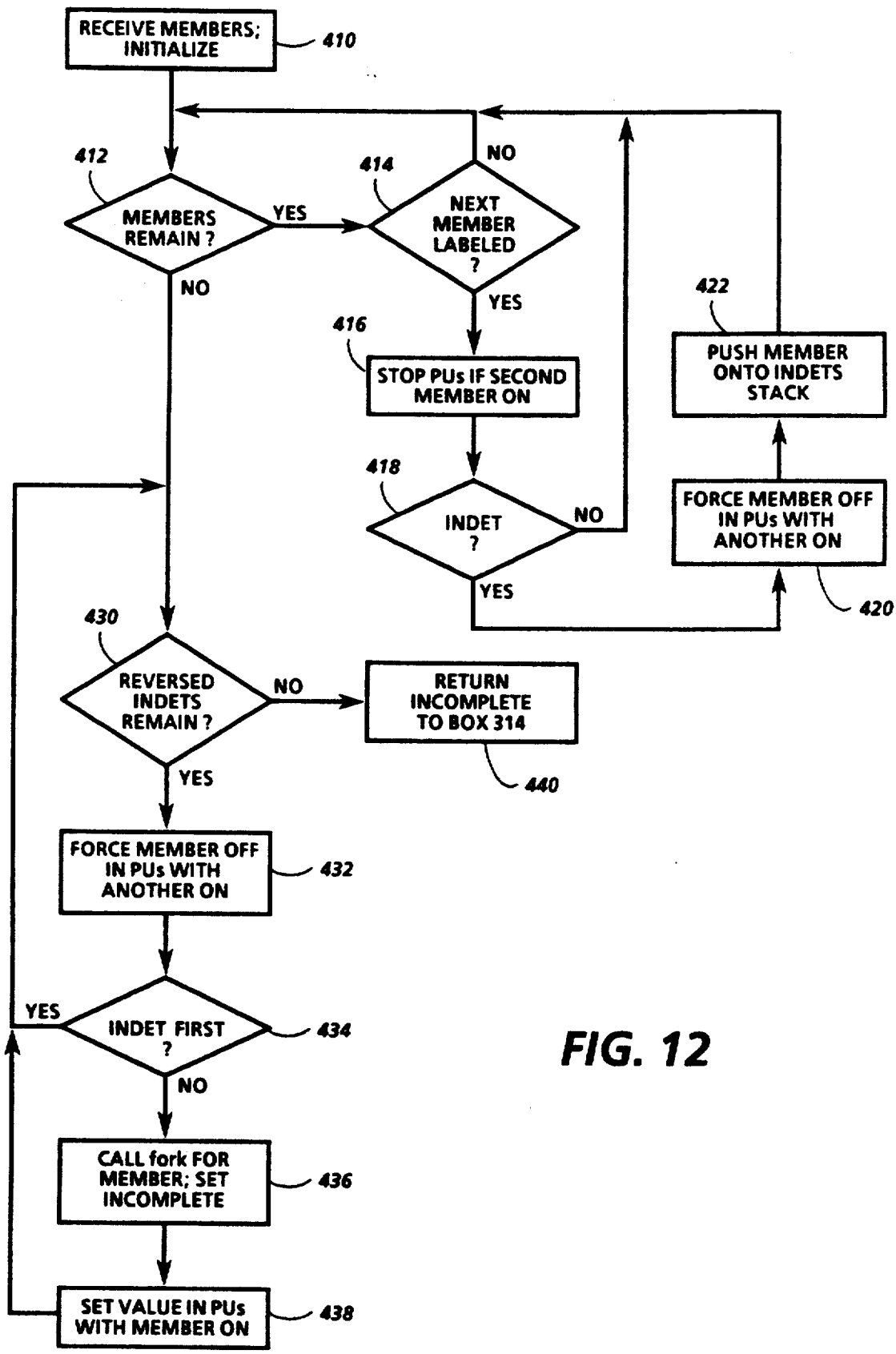
FIG. 12 is a flow chart showing steps for broadcasting an exclusive class restriction in FIG. 10.
Figure 13:
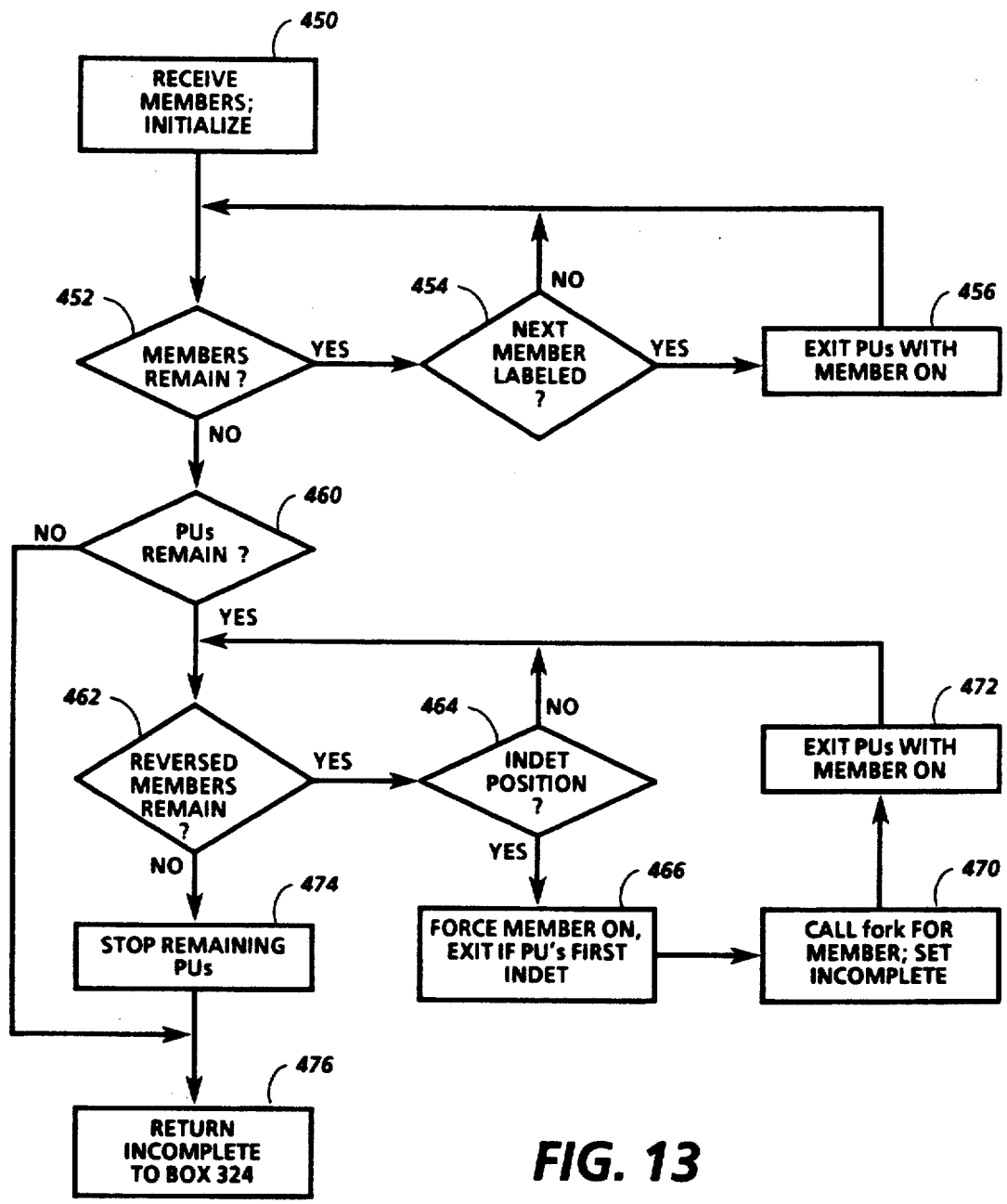
FIG. 13 is a flow chart showing steps for broadcasting a closed class restriction in FIG. 10.

FIGS. 11–13 show general steps in the broadcast functions. FIG. 11 shows general steps of broadcast-justification; FIG. 12 of broadcast-excl-class; and FIG. 13 of broadcast-class-closure.

The function broadcast-justification begins in box 360 in FIG. 11 by receiving the justification to be broadcast. It also initializes certain values, including a variable Incomplete that is initialized to NIL and certain flag fields in each processing unit that will be used during subsequent operations. The flags field in each processing unit include its context flag, discussed above, but also includes a number of other flags including *good, *temp1, *temp2, and *temp3. Of these flags, *good is used in Appendix A to indicate whether a processing unit is activated, while *temp1, *temp2, and *temp3 are used for temporary storage of a value.

For each of the flags and for the other fields, such as the label and indet value of each assumption and the label of each node, it is helpful to keep in mind that the host processor sets a flag's or field's bit position but not its value; in a call to the processing units, the host processor provides the bit positions of the values to be operated on and each processing unit operates on the contents of those bit positions in its memory in accordance with the call from the host processor. For consistency, we will refer to the contents of each bit position as "on" or "off".

As described above, each justification has one or more antecedents and a consequent. The step in box 362 provides instructions to the parallel processor that cause an exit from the current function by each processing unit ("PU") for which the consequent is on. Unlike a processing unit that is stopped, a processing unit that exits from the current function does not become inactivated, but its context flag is turned off so that it does not respond to subsequent instructions directed to the processing units whose context flags are on. For example, the step in box 362 can be performed by moving the complement of the value of the consequent's label to the context flag in each activated processing unit.

The step in box 370 begins a loop that handles each antecedent of the justification and identifies the processing units in which the value of that antecedent is off, meaning it is inconsistent with the value the antecedent must have for the justification to be applicable. If the justification's consequent is ⊥, this loop is also used to mark indeterminate antecedents in each processing unit so that one of them can later be forced rather than forked, as discussed below; this can be done by turning the label bit on for the selected indeterminate antecedent in each processing unit, which may be the first. The test in box 372 first determines whether the antecedent currently has a label bit position. If so, the step in box 374 provides instructions to the parallel processor that cause an exit by each processing unit for which the antecedent is off. Then, the function returns to handle the next antecedent, in box 370.

If the test in box 372 determines that the antecedent has no label bit position, the step in box 376 returns the value NIL to the step in box 306 in FIG. 10, so that Incomplete is set to NIL. This means that the broadcast is completed and the justification can be removed from the queue, in this case because the antecedent has no extension. Similarly, if the test in box 378 determines that all the activated processing units have exited, so that none remain, the step in box 376 returns NIL to the step in box 306, in this case because no activated processing units are in the consequent's extension.

The step in box 380 then begins a second loop that forks the indeterminate antecedents as necessary, delaying forking is possible. As noted above, in handling a justification whose consequent is ⊥, the first loop that begins with the step in box 370 marks indeterminate antecedents in each processing unit so that one of them can later be forced to its only possible value rather than forked, which would unnecessarily use processing units. For example, the first loop can mark the first such antecedent in each processing unit that has an indeterminate value, the mark indicating that the antecedent should be forced to one value in that processing unit rather than forked. Then the first loop resets a value in that processing unit so that subsequent indeterminate antecedents are marked to indicate they must be forked.

Since only assumptions can be indeterminate in Appendix A, the second loop handles only the assumptions of the justifications, and it handles them in reverse order, reaching the assumption that should be forced after forking all the other indeterminate assumptions. The test in box 382 determines whether the next assumption is indeterminate. If not, the function returns to box 380 to handle the following assumption.

When an indeterminate assumption is found, the step in box 384 checks the mark in each processing unit indicating whether this assumption should be forced rather than forked. If it should be forced because the consequent is ⊥ and all the other antecedents are on in a given processing unit, the step in box 384 forces its value off. Then, each processing unit in which it has been forced exits, because no further forking is necessary.

For the remaining processing units, the step in box 386 calls the function fork for this assumption and sets Incomplete true if forking overflowed, so that this justification should be kept on the queue. In each pair of processing units resulting from forking, one will turn off the antecedent currently being handled, and that processing unit exits in box 388, leaving only those processing units in which all of the antecedent handled thus far are on. Then the function returns to handle the next assumption in box 380.

If the test in box 390 determines that some of the processing units remain after the second loop has been completed, the function branches in box 392 based on whether the consequent of the justification is a node or ⊥. If ⊥, the remaining processing units are those for which all of the antecedents are on, so that the subsets of assumption space are inconsistent. Therefore, the step in box 394 stops those processing units, meaning that they are inactivated and could be used to handle other subsets of assumption space. On the other hand, if the consequent is a node, the step in box 396 sets its label on, assigning a label bit position if necessary in order to do so. If it is necessary to assign a label bit position, the step in box 396 also calls the consumers for this node, because it is now in, meaning it has a non-empty extension. The consumers are functions that provide information to the problem solver, as noted above. Also, the step in box 398 loads any constraint of which this node is an antecedent or member onto the queue, because the result of broadcasting that constraint may be changed due to the change in the value of the node.

In the end, the function in FIG. 11 returns the value of Incomplete, indicating whether forking overflowed. If so, the justification will be kept on the queue for another broadcast. Even if the justification is kept on the queue, however, the changes that it made in values stored in the processing units remain.

As can be seen by comparing FIG. 11 with FIG. 8, the steps followed by broadcast-justification are ordered somewhat differently than those of FIG. 8, but the result is substantially the same—forking is delayed unit necessary. Like broadcast-justification, broadcast-excl-class and broadcast-class-closure each employ a first loop and a second loop, with processing units for which no forming is needed exiting in the first loop, and forcing and forking occurring in the second loop.

As described above, an exclusive class restriction has at most one member that is on, and is equivalent to the conjunction of a set of justifications that includes one justification for each pair of members, each justification having both members in its pair on and the consequent ⊥. Such a set of justifications occurs frequently, however, when at most one of a number of mutually exclusive alternatives can be true. Furthermore, such a set of justifications can be handled more efficiently together than separately. One technique for doing so is shown in FIG. 12, in which broadcast-excl-class begins in box 410 by receiving the members of an exclusive class restriction.

Certain variables are also initialized, including the variable Incomplete and an indets stack for indeterminate members.

The step in box 412 begins the first loop of broadcast-excl-class, in which each member is handled in sequence. The test in box 414 determines whether the next member currently has a label bit position. If not, the member has no extension, so it is not on in any of the processing units and need not be handled further. Therefore, the function returns to box 412 to handle the following member.

If a member has a label bit position, the step in box 416 provides instructions to the parallel processor causing each processing unit for which this member is the second member that is on. On the other hand, if this member is on, but none of the previously handled members were on for a given processing unit, a value is set in that processing unit to indicate that one member is on, so that the processing unit will stop if a subsequent iteration of the step in box 416 discovers another member on.

The function branches in box 418 based on whether the member being handled in indeterminate. If not, the function returns to box 412 to handle the following member. If the member is indeterminate, and if the value is set indicating that another member is on, the step in box 420 forces the current member off. Unless all the processing units have a member on, the step in box 422 pushes the current member onto the indets stack, because it may subsequently be forked. The step in box 422 also sets the label of the first indet of each processing unit to indicate that it should not be forked.

When all the members have been handled by the first loop, the second loop, beginning with the test in box 430, goes through the indets stack in reverse order, starting with the most recently pushed. For each indeterminate member in the stack, if a processing unit's value indicates that it has a member on the indeterminate member is forced off, in box 432. The branch in box 434 depends, for each processing unit, on whether the member from the indets stack is still indet and is not the first indet for that processing unit, i.e. the indeterminate member whose label was set. Because the indets stack is handled in reverse order, the indet that was first will be handled last in the second loop, and it is not forked, since there is no need to do so—it can remain indeterminate and still be consistent with the exclusivity of the class restriction, since the class restriction can have either zero or one members on.

If the member being handled is not the first indet for the processing unit, the step in box 436 calls fork for that member and sets Incomplete true if the fork overflows. Then, the value indicating a member is on is set in each processing unit in which the member is on as a result of the fork, in box 438. None of the processing units exits, however, because there are further indets to be handled on the stack, and the function returns to box 430 to do so.

Finally, when all the indets have been handled, the step in box 440 returns Incomplete to the step in box 314 in FIG. 10. As discussed above, the class restriction will be kept on the queue if Incomplete is true, indicating a fork overflow occurred.

In comparison with an exclusive class restriction, a closed class restriction has at least one member on, and is equivalent to a justification in which each antecedent is the negation of one of the members of the class restriction and the consequent is ⊥. A closed class restriction is often an exclusive class restriction, only one of whose members can be true. Although the broadcasting of a closed class restriction is fundamentally similar to broadcast-justification, it can be made more efficient, as illustrated by the steps of broadcast-class-closure shown in FIG. 13.

The function of FIG. 13 begins in box 450 by receiving the members of the closed class restriction, and initializes certain values, including Incomplete. Then, as in FIG. 11, the function performs two loops, the first to exit those processing units that have a member of the class restriction on and the second to fork members of the class restriction as necessary.

The first loop begins with the step in box 452, and handles each member of the class restriction in succession. The test in box 454 determines whether the next member is labeled. If not, it is off for all processing units, so that the function proceeds to the following member by returning to the test in box 452. If the next member has a label bit position, the step in box 456 exits each processing unit for which the next member is on. Also in box 456, if the member is the first indeterminate member for a processing unit, its label is set on for that processing unit to indicate that the member should be forced rather than forked in the second loop.

If the test in box 460 determines that any activated processing units remain after the first loop is completed, the second loop begins handling the members in reverse order, beginning with the test in box 462. The test in box 464 determines whether the next member has an indet bit position, and if not proceeds to the following member by returning to the test in box 462. If the member being handled has an indet bit position, the step in box 466 forces the member on in those processing units in which it is the first indeterminate member; those processing units exit because they now have at least one member on.

The step in box 470 then calls the function fork for the member in any remaining processing units in which it is indeterminate, and sets Incomplete true if a forking overflow occurs. Of the forked processing units, those that have the member on exit in box 472 before the function returns to the test in box 462.

When all the class restriction's members have been handled in the second loop, the remaining processing units are those in which none of the class restriction's members is on. The step in box 474 stops those processing units, and the step in box 476 then returns Incomplete to the step in box 324 in FIG. 10.

Figure 14:
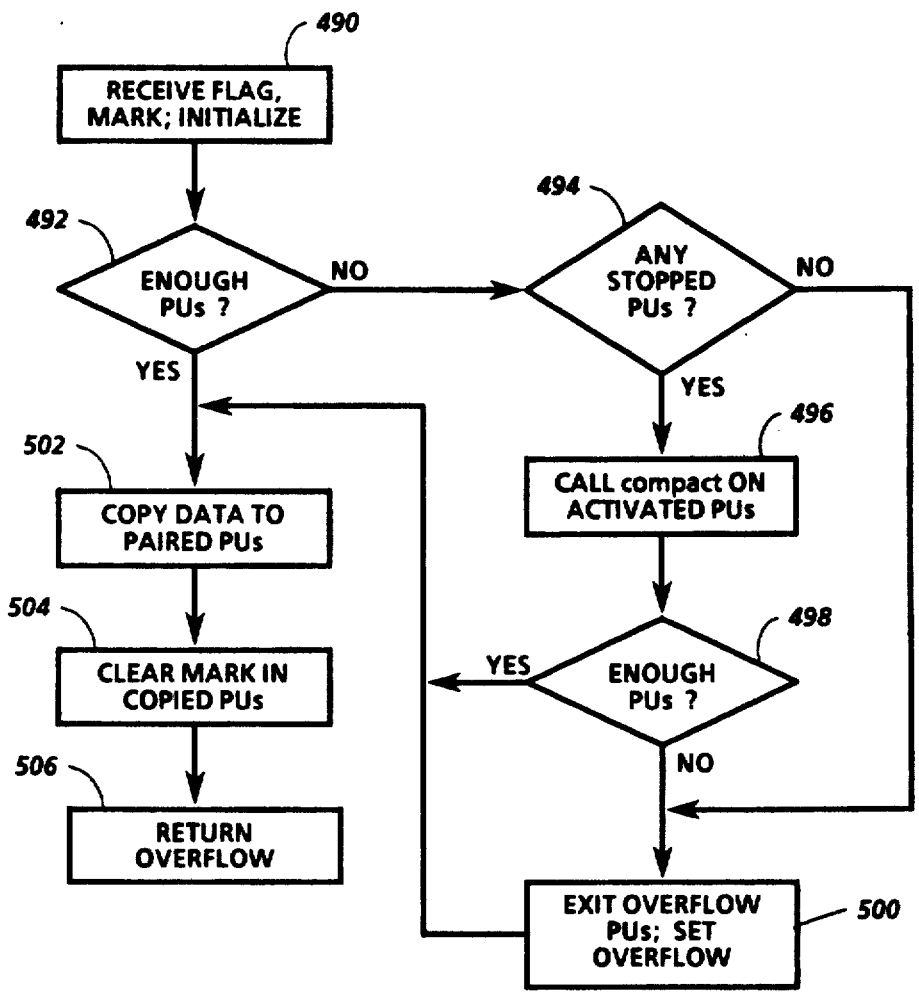
FIG. 14 is a flow chart showing steps for forking in FIGS. 11–13.

Each of the functions in FIGS. 11-13 calls the function fork with an antecedent or member, to copy data from each of a group of activated processing units to a paired additional processing unit. FIG. 14 shows steps performed in response to such a call by the code in Appendix A.

The step in box 490 receives the call, including the bit positions Flag and Mark, Flag being set in each processing unit that is in the group and Mark being a position that is on in each processing unit in the group but will be cleared in each of the paired additional processing units, so that the function that called fork can use the value in Mark to set the antecedent's or member's label in each copying processing unit to be different from that in the copied processing unit. The step in box 490 also initializes values, including Overflow, a variable that indicates whether a forking overflow has occurred.

The test in box 492 determines whether enough contiguous processing units are available to perform the forking operation. If not, the test in box 494 determines whether any processing units have been stopped since the last compacting operation, which makes stopped processing units available again for forking. If so, the step in box 496 calls the function compact on the activated processing units, causing them to be copied into a compact group of the processing units, and making the inactivated processing units available. The test in box 498 then determines whether there are no enough processing units available. If not, the step in box 500 exits those processing units that cannot be copied and sets Overflow true to indicate a fork overflow.

In any event, each of the activated processing units that can be copied, which may include all the activated processing units, is copied to a paired processing units by the step in box 502. The function fork call another function send-properly to perform this copying, and send-properly in turn instructs the parallel processor to set a test-flag value in each copied processing unit that differs from the test-flag value in the processing unit it was copied from. This test-flag value is then used in box 504 to clear the Mark bit position in the copied processing unit. Then the function returns Overflow to the function that called it, in box 506.

In addition to the queue related function discussed above, Appendix A includes functions for retrieving results of parallel propositional reasoning, as in box 206 in FIG. 7. Two of these functions, in? and true?, are very simple functions. The function in?, upon receiving an assumption, returns true if any of the activated processing units has that assumption's indet or label on. Upon receiving a node, in? returns true if any of the activated processing units has that node's label on. If none of the activated processing units has a given label or indet on, its bit position is freed, as discussed above in relation to FIG. 9. The function true? is even simpler, returning true if an assumption's indet bit is off and its label is on for all activated processing units and returning true if a node's label is on for all activated processing units.

Figure 15:
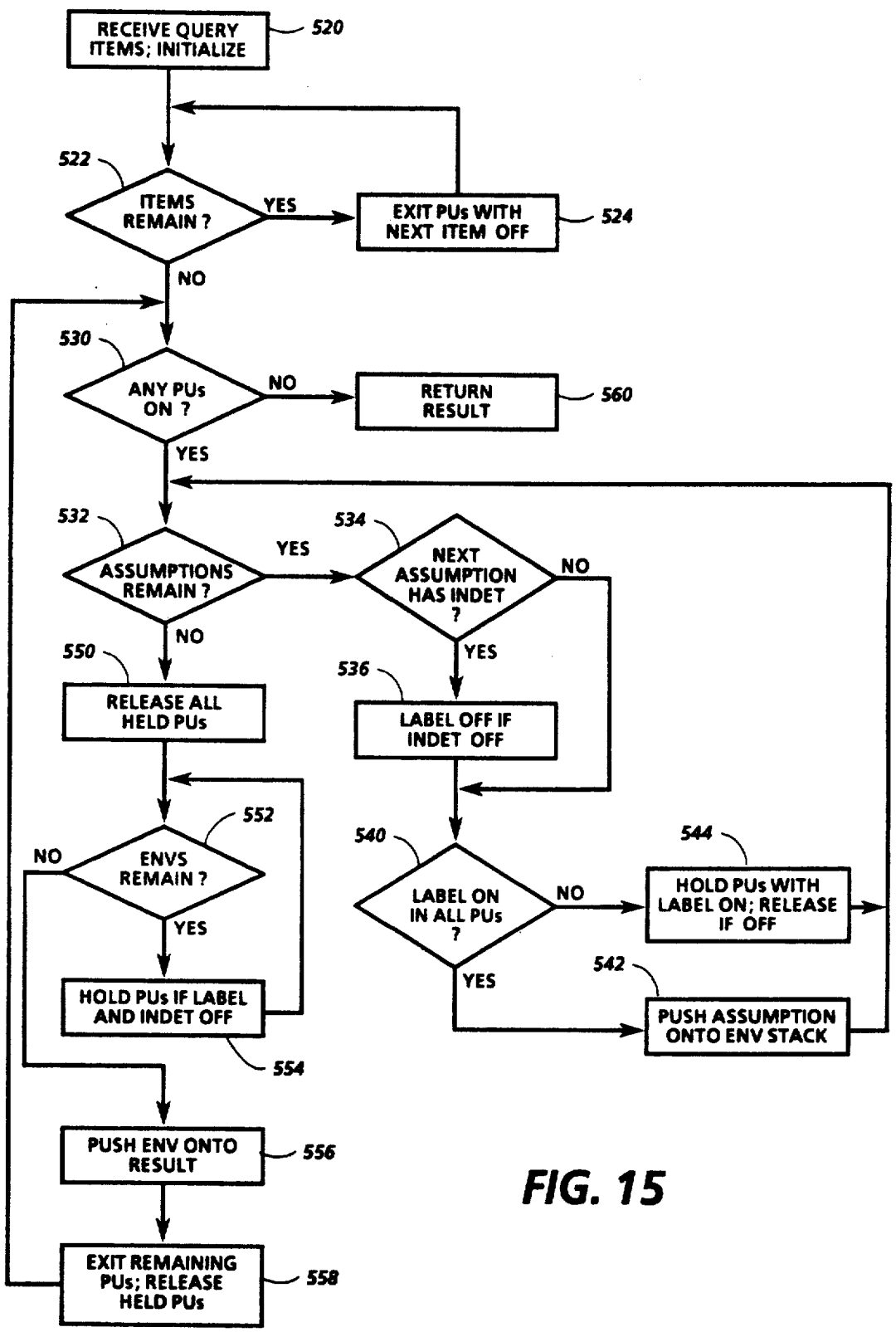
FIG. 15 is a flow chart showing steps for retrieving results in FIG. 7.

A more important function is get-label, which can be used to retrieve the extension of a conjunction of assumptions and nodes. FIG. 15 shows steps by which get-label retrieves the results of parallel propositional reasoning in such a way as to reduce the description of each extension. Because get-label can be called without clearing the queue, a problem solver can call it at any time that other operation are not in progress, regardless of the current state of the queue. Note, however, that its result will not fully reflect any constraints still in the queue.

The function get-label begins in box 520 by receiving a query that includes one or more items, each an assumption or node. The function handles each item in a first loop that starts with the test in box 522. Within this first loop, the step in box 524 exits any PU that does not have at least one of the label or indet on for that item, and exits all the PUs if no label bit position is assigned to one of the items. The effect of this first loop is to obtain a set of processing units that includes the extension of the conjunction of the items.

The function then begins a second loop that continues until all the processing units have exited, starting with the test in box 530. Within this second loop are two inner loops, the first of which handles each of the assumptions that have been created during the current propositional reasoning task. This first inner loop finds a minimal group of subsets of assumption space that cover the extension of the conjunction of the query items. The second inner loop then goes through those subsets, and obtains a description of each subset in terms of the assumptions.

The first inner loop begins with the test in box 532. As long as assumptions remain to be handled, the test in box 534 determines whether the next assumption has an assigned indet position. If so, the assumption's label value in each processing unit is turned off if indet is on, in box 536. Then, the function branches in box 540 based on whether the assumption's label is on in all processing units in the current group of processing units. If so, the assumption is pushed onto an env stack that includes a description of a subset in the minimal group. If not, however, the processing units in which that assumption label is on are held and the previously held processing units in which that assumption's label is off are released, in box 544, and the assumption is not pushed onto the env stack. As a result, the env stack includes a set of assumptions that, in conjunction, define a subset of assumption space.

When the first inner loop has handled all the assumptions, the step in box 550 releases any held processing units in preparation for the second inner loop. Therefore, at the start of the second inner loop, the same reduced group of processing units is available as at the start of the first inner loop within the second outer loop.

The second inner loop goes through each of the assumptions in the env stack, starting with the test in box 552. This second inner list simply exits each processing unit for which neither the label nor indet of fan assumption is on, in box 554. Then, in box 556, the current env stack is pushed onto a result stack, to be held until conclusion of the outer loop. Before continuing with the next iteration of the outer loop, the step in box 558 exits the currently remaining processing units and releases each of the processing units that was held during an iteration of box 554 to form a new reduced group of processing units for the next iteration of the outer loop.

Finally, when all the processing units have exited in box 558, the test step in box 560 returns the result, which is a list of the sets of assumptions that were on the env stack after each iteration of the first inner loop. This result describes the subsets of assumption space in the extension of the query items, because each set of assumptions defines a subset of assumption space.

5. Performance Improvements

The implementation in Appendix A provides a useful comparison of parallel ATMS and serial ATMS. Placing thirteen non-attacking queens on a thirteen by thirteen chess board runs seventy times faster on a Connection Machine with 16K processing units than the fastest sequential implementation on a Symbolics Lisp Machine, taking 60 seconds rather than 4235 seconds to find 73,712 solutions.

The implementation in Appendix A has also been used with other problem solvers, such as large qualitative reasoning programs in which performance limitations of serial ATMS had been a severe bottleneck. As expected, the parallel ATMS runs very quickly, with the effective speedup for a given problem depending on how much of the problem solver's time the serial ATMS would otherwise consume.

Figure 16:
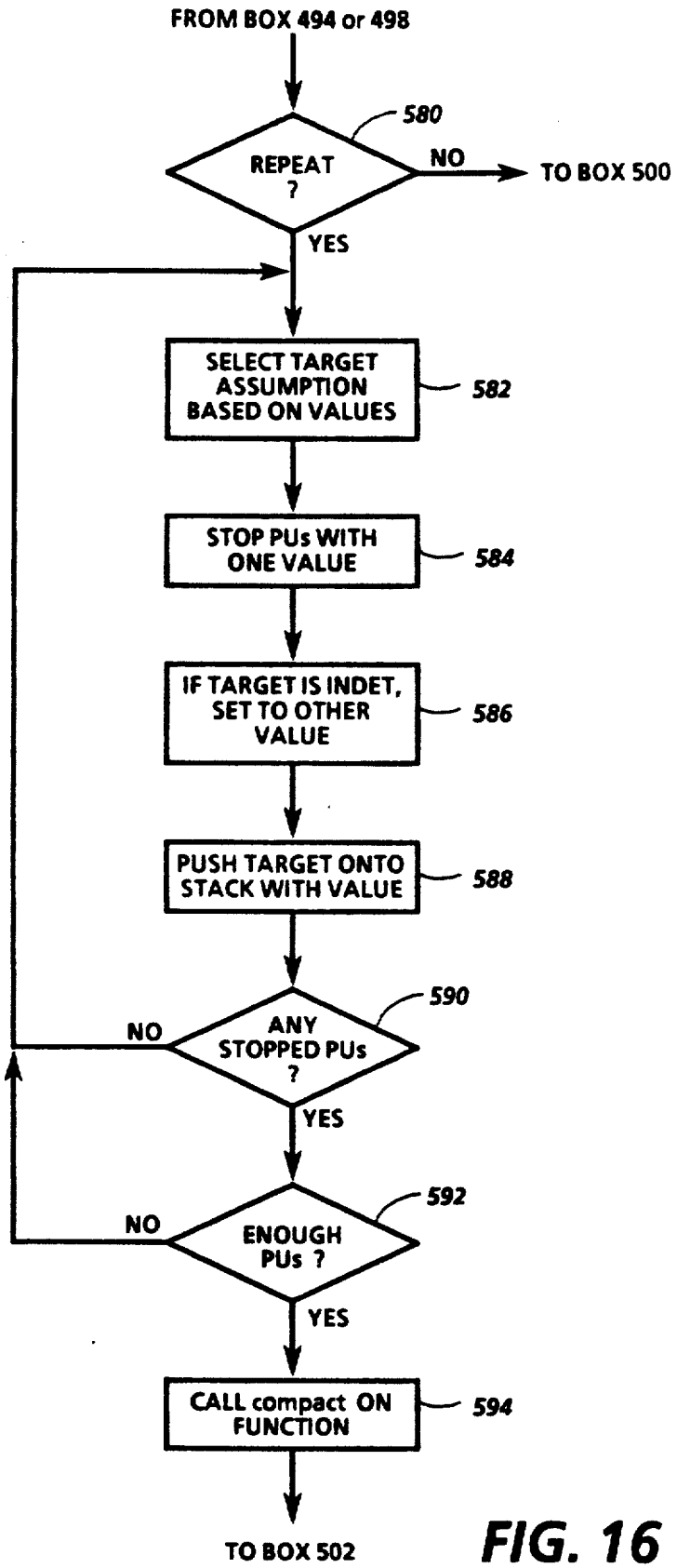
FIG. 16 is a flow chart showing additional steps in FIG. 14 to implement backtracking.
Figure 17:
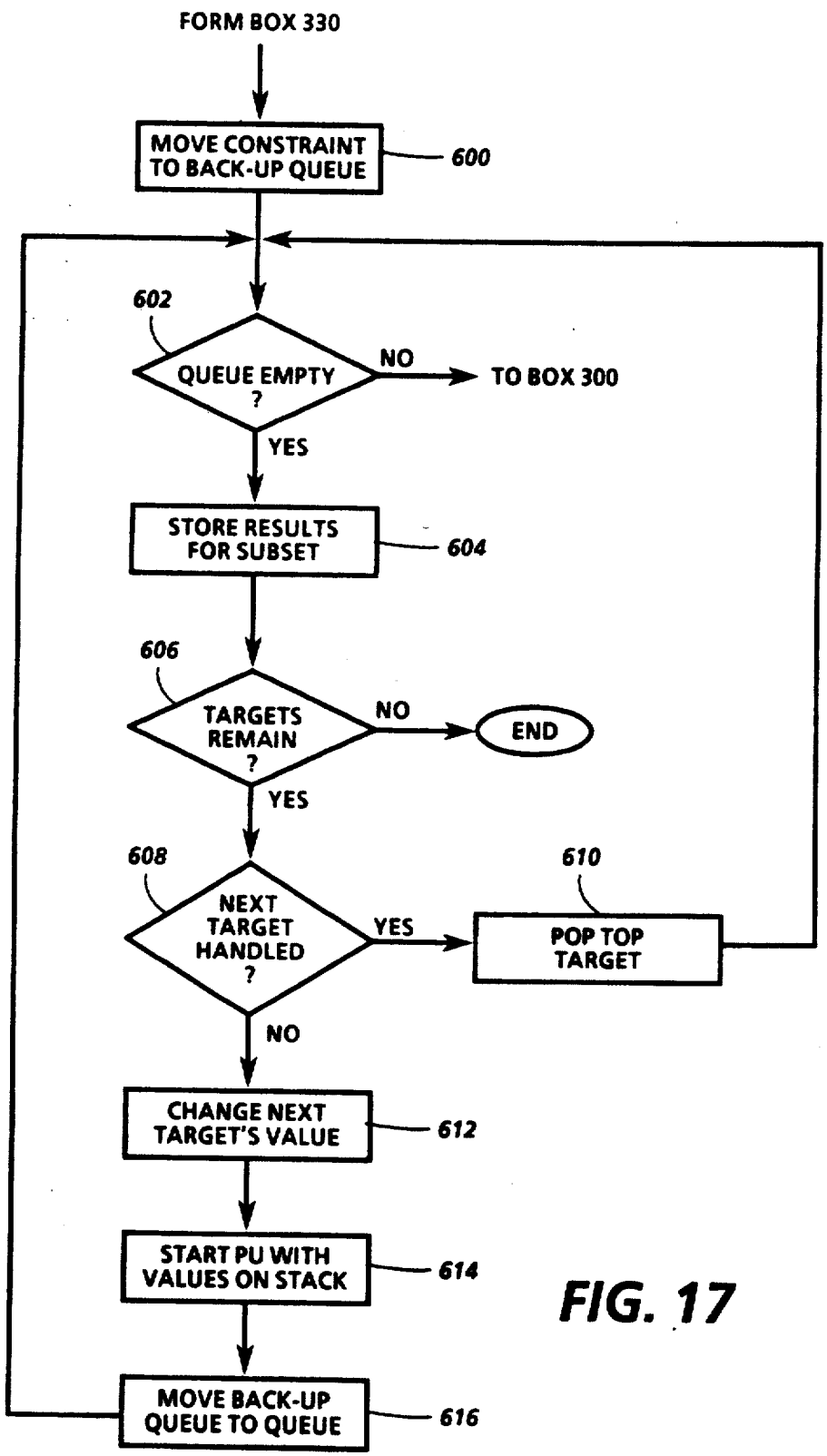
FIG. 17 is a flow chart showing additional steps in FIG. 10 to implement backtracking.

Even hundreds of thousands of processing units are insufficient for many problems. Therefore, some combination of parallel and sequential propositional reasoning will be necessary in some cases to obtain satisfactory performance. FIGS. 16 and 17 illustrate backtracking techniques for introducing sequential operations into the implementation of Appendix A. FIG. 16 shows steps for freeing processing units for forcing a target assumption. FIG. 17 shows steps for handling the resulting stack of target assumptions when the queue has been completed.

The technique of FIG. 16 is a modification of the function of FIG. 14. This modification depends on modifications to the function of FIG. 10. If the step in box 334 in FIG. 10 determines that the queue has been repeated, the function would not end as in FIG. 10, but would set a repeat value indicating that a queue repeat had occurred, before continuing to the step in box 336. Then, in performing the next broadcast function, in one of boxes 304, 312, or 322, a call would again be made to the function in FIG. 14, modified to include the additional steps in FIG. 16.

The steps in FIG. 16 begin when the test in box 494 in FIG. 14 determines that there are not stopped processing units or when the test in box 498 determines that there are not enough processing units for the requested forking operation. Before proceeding to box 500, as in FIG. 14, the test in box 580 determines whether the repeat value has been set. If not, the function in FIG. 16 would return to box 500, continuing as described above in relation to FIG. 14. But if repeat has been set, the additional steps in FIG. 16 are performed to backtrack through at least one assumption.

The step in box 582 first selects a target assumption for backtracking, based on the results of propositional reasoning so far. For the least duplication of work, this step could include checking, for each assumption created, the number of processing units with indet on; the assumption with the fewest indeterminate values would require the least duplication of work, but might require a large amount of backtracking. Another approach, that would take the number of indeterminate values into account, would be to count the true values and count the false values for each assumption to find the assumption for which the lesser of these two counts is the greatest; this approach would reduce backtracking because an assumption with a better balance between true and false values involves less backtracking, though it may involve more duplication of work if it has more indet values than other assumptions.

When a target assumption is selected, the step in box 584 stops the processing units for which that assumption is determinate and its label has one of its values, leaving only processing units for which the assumption either is indeterminate or is determinate with its label having the other value. Each processing unit in which the assumption is indeterminate then makes it determinate with its label having the other value, in box 586, so that the assumption has been forced to the other value in all remaining processing units. The step in box 588 puts the target on a target stack of targets for subsequent operations, with a value that plays a role in the operation of the stack, as discussed below.

The value in the processing units that are stopped in box 584 may be the same value in all cased, such as off, or may be determined based on the current results of propositional reasoning. To obtain a larger number of free processing units, the value could be whichever value occurs in a greater number of processing units.

At this point, the step in box 590 determines whether any of the processing units stopped in box 584. If not, the function returns to select another target assumption in box 582. But if processing units have stopped, the step in box 592 determines whether enough processing units are now available for the forking operation. If not, the function similarly returns to box 582. But if so, the step in box 594 calls compact as in box 496 in FIG. 14. Finally, when enough contiguous processing units are available, the repeat value is cleared and the function returns to box 502 in FIG. 14 to perform the forking operation.

The steps in FIG. 14 will be repeated whenever necessary until the queue is empty. At that point, the target stack may include several assumptions that have been forced, so that backtracking will be necessary. FIG. 17 shows one way of modifying the function of FIG. 10 to perform the required backtracking.

When the step in box 330 determines that a constraint has been broadcast without an overflow, the step in box 600, rather than simply removing the constraint from the queue as in box 338, moves it to a back-up queue to be used during backtracking. Then, when the test in box 604 determines that the queue is empty, the step in box 604 stores the current results of propositional reasoning so that they can be combined with results obtained during backtracking. The results to be stored may depend on the propositional reasoning task being performed—it may be necessary to store the extension of each of the nodes or it may suffice to store an indication of whether a specific node is in. The results to be stored can be obtained through the result retrieval functions discussed above.

When the appropriate results have been stored, the step in box 606 begins an iterative loop that handles each assumption on the target stack, beginning with the one most recently pushed onto the stack. The test in box 608 determines, for the next assumption on the stack, whether it has already been handled. For example, if all assumptions are pushed onto the stack with the value on, the value on the stack could be changed from on to off when it is being handled, so that the test in box 608 can be based on the assumption's value. Or the stack can include an additional value for each assumption that is set when that assumption is being handled. If it has already been handled, it is popped from the stack in box 610, and the function proceeds to the next target assumption.

The step in box 612 changes the value of the next target, turning it off if it was previously on, and vice versa. This can indicate it is being handled, as noted above, but it also sets up the value for box 614. The step in box 614 starts a single processing unit for which each target assumption is determinate and has the value indicated in the stack. Each target assumption currently being handled is off in this processing unit, while other target assumptions are on, so that his processing unit covers a subset of assumption space. Therefore, parallel propositional reasoning can now be performed for that subset. The step in box 616 moves the constraints from the back-up queue to the queue and returns to box 602 to determine whether the queue is empty. If not, the function returns to box 300 to begin handling the constraints on the queue.

Processing of the queue continues until it is again empty, in the manner described above in relation to FIG. 10. Again, results are stored in box 604. Finally, when the queue is empty and all the targets on the target stack have been handled, the function ends, having completed propositional reasoning.

The modifications in FIGS. 16 and 17 provide backtracking only when parallel propositional reasoning fails because of inadequate processing units. Even when backtracking is performed, the choice of target assumptions is guided by previous results of propositional reasoning, to make backtracking relatively efficient. These techniques extend the usefulness of parallel propositional reasoning to problems that would otherwise exceed machine capacity.

D. Miscellaneous

Although the invention has been described in relation to propositional reasoning, it is intended that the term "propositional reasoning" cover a wide variety of similar reasoning tasks, including components of constraint satisfaction; qualitative reasoning; parsing of text and other data; diagnosis; design; searching for optimal paths, for optimal schedules, and for other solutions; document formatting or layout; and natural language processing such as disjunctive unification in systems such as the lexical functional grammar (LFG). In short, the invention is not limited to those types of propositional reasoning conventionally used in problem solving, but can be used for any type of propositional reasoning. The scope of the invention can be appreciated by considering that, in principle, all NP-complete problems are reducible to Boolean satisfaction problems and could be solved by ATMS, so that parallel ATMS would be applicable to all those problems.

The problem solver in the implementation of Appendix A is a simple illustration of how a problem solver could be written for use with the invention. The published literature about ATMS, incorporated by reference above, explains more generally how to write such problem solvers.

The implementation of Appendix A builds on conventional ATMS notions, such as assumptions, nodes, and justifications. For computational simplicity, however, it may be advantageous to eliminate some distinctions between assumptions and nodes and generalize the implementation to handle arbitrary propositional clauses, such as clauses in the disjunctive normal form. For example, each justification with a node consequent could be converted to a disjunctive clause whose terms include the consequent and the negation of each antecedent of the justification. Each justification with a contradictory consequent could be converted to a disjunctive clause whose terms include the negation of each of the antecedents. A clause of this form could be broadcast simply by providing the terms of the clause, with broadcasting different slightly if the cause is exclusive, in which case only one of its terms could be true. It would still be appropriate to distinguish between elements such as assumptions that can be forked if necessary and elements such as nodes that should always be forced rather than forked.

The implementation of Appendix A uses a queue to reorder formulas, but the queue could be managed more efficiently by not keeping as many formulas on the queue. When a node's label is forced in on in box 396 in FIG. 11, formulas with that node as an antecedent or member are loaded onto the queue in box 398. This suggests an alternative technique for handling a formula after an unsuccessful broadcast. When a broadcast fails due to forking overflow, a record could be kept of which of the clause's terms could still be forked. When one of those terms is forced or forked, that clause could be loaded on the queue and broadcast again, possibly reducing the number of activated processing units. Indeed, rather than maintaining a queue, a list of clauses to be broadcast could be set up after reach forcing step and handled iteratively.

The implementation of Appendix A makes use of a Connection Machine, but the invention could be used with any other suitable parallel processor with sufficient processing units, real or virtual, to handle a given problem. In fact, the implementation of Appendix A does not require some of the features of the Connection Machine, suggesting that the invention could be implemented more efficiently on a parallel processor with a different architecture.

For example, the Connection Machine includes a complex router system that is used in Appendix A in processor management operations. Another possibility would be to connect the processors in an m-dimensional grid, like the Connection Machine's grid but possibly with more dimensions, and then matching up processors with some form of expanding-wave allocation, described in Hilis, W. D., *The Connection Machine*, MIT Press, Cambridge, Mass., 1985, incorporated herein by reference. Silicon might be better spent on more processing units than on the complex router.

The Connection Machine also has more memory per processor than may be necessary for most propositional reasoning. Here again, these resources might be better spent on more processing units.

The implementation in Appendix A does not require high performance communication throughout the processing unit pool. Although all processing units must be able to find an additional free processing unit quickly, they never need to communicate with other activated processing units, Therefore, a single host processor could divide the assumption space among several Connection Machines, each handling processor management operations such as forking from its own pool of processing units. Only when one machine became saturated would it be necessary to shift information to another. Load-balancing heuristics could help minimize the frequency of such shifts.

Similarly, it may be feasible to implement the invention on a specially designed parallel processor making use of identical customized chips, each with many processing units on a chip. Each processing unit would be very simple, performing operations for a subset of assumption space, and operating independently of other processing units except for a forking operation. Each chip could thus be like a memory chip with some logic; each row of memory could serve as a processing unit, with the logic processing each bit within each row of memory in parallel to perform an operation like those described above on the Connection Machine. Forking could be performed through a holding register, by using shift registers, or through a permutation matrix.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

```lisp
;;; -*- Mode: LISP; Syntax: Common-lisp; Package: MATMS; Base: 10 -*-

(in-package 'matms)

"(c) Copyright 1987, 1988 Xerox Corporation.  All rights reserved."

(export '(new-assumption
          assumption?
          assumption-datum
          assumption-value
          new-node
          node?
          node-datum
          new-class
          class?
          class-datum
          new-justification
          justification?
          justification-datum
          *contradiction*
          add-to-class
          attach-consumer
          close-class
          init-atms
          in?
          true?
          get-label
          *postpone-class-processing*
          run-class-constraints))

;;; None of these fields (except datum) should be set by the client;
;;; only node-conseqs, class-exclusive?, class-closeable?, class-consumers, class-members,
;;; justification-ante, and justification-conseq should be read (defstruct label
  pos                                   ; a bit position in each processor (or NIL)
  )

(defstruct (assumption (:include label) (:predicate assumption?))
  indet                                 ; a bit position, if this assumption might be
                                        ; indeterminate
  datum
  value                                 ; both for client
  )

(defstruct (node (:include label) (:predicate node?))
  conseqs                               ; justifications and excl-classes
  consumers                             ; consumers and classes, if label-pos = NIL
  datum                                 ; for client
  )

(defstruct queueable
  next-queue-item                       ; NIL if we're not queued yet
  )

(defstruct (class (:include queueable) (:predicate class?))
  exclusive?                            ; form pairwise nogoods
  closeable?                            ; if t, can only add assumptions
                                        ; if :closed, can't add anything
  consumers                             ; consumers to be attached to each member
  needs-closure?
  needs-excl?
  members                               ; nodes and assumptions in this class
  datum                                 ; for client
  )

(defstruct (justification (:include queueable) (:predicate justification?))
  ante                                  ; antecedant nodes and assumptions
  ante-a-reversed                       ; just the assumptions, in reverse order
  conseq                                ; consequent (node or assumption)
  datum                                 ; for client
  )

;;; Count calls to primary functions
(defvar *call-counts* nil)
(defun note-function-call (name)
  (setf (getf *call-counts* name)
        (1+ (or (getf *call-counts* name)
                0))))
```

```lisp
(defun show-function-calls ()
  (loop for (function count) on *call-counts* by 'cddr
        do (format t "~%~14a ~4d" function count)))

(defun init-function-call-counter ()
  (setq *call-counts* nil))

;;; Control flags (defvar *postpone-class-processing* nil)

;;; These can be read (but not set) by the client, although *contradiction* is the only
;;; one they should care about.  None of them will be initialized until (init-atms) has
;;; run.

(defvar *contradiction*)       ; (it's actually an assumption)
(defvar *assumptions*)         ; all assumptions (except *contradiction*)
(defvar *nodes*)               ; all nodes
(defvar *justifications*)      ; all justifications
(defvar *classes*)             ; all classes ;;; Private (defvar *queue-head*)
(defvar *queue-tail*)
(defvar *compactable*)
(defvar *free-start*)
(defvar *num-proc*)

(defvar *next-free-bit*)
(defvar *first-bit*)
(defvar *free-bits*)

(defvar *delay-queue* nil)

;;; Statistics (defvar *allocations*)
(defvar *compactions*)
(defvar *losses*)

;;; CM vars (defconstant send-buffer-size 32)

(defvar *send-buffer* 0)
(defconstant *count send-buffer-size)
(defvar *good)
(defvar *temp1)
(defvar *temp2)
(defvar *temp3)

;;; Private CM macros and functions (defun new-pos ()
  (or (pop *free-bits*)
      (and (< *next-free-bit* cm:*user-memory-address-limit*)
           (prog1 *next-free-bit*
                  (incf *next-free-bit*)))
      (progn (mapc #'in? *assumptions*)
             (mapc #'in? *nodes*)
             (pop *free-bits*))
      (error "out of bit positions")))

(defun release-pos (p)
  (push p *free-bits*))

(defmacro *any (p)
  '(eql 1 (cm:global-logior ,p 1)))

(defmacro *global-any (p)
  '(eql 1 (cm:global-logior-always ,p 1)))

(defmacro select-good ()
  '(cm:move-always cm:context-flag *good 1))

;;; Initialization (defun init-atms (&optional size)
  (init-function-call-counter)
  (let ((*lisp-i:inside-*cold-boot-p t))
    (declare (special *lisp-i:inside-*cold-boot-p))
    (if size
        (cm:cold-boot :dimensions size)
        (cm:warm-boot))))
```

```
(setq *contradiction* (make-assumption :datum "False"))
(setq *assumptions* nil
      *nodes* nil
      *justifications* nil
      *classes* nil)
(setq *queue-head* nil
      *queue-tail* nil)
(setq *compactable* nil
      *free-start* 1
      *num-proc* cm:*user-cube-address-limit*)
(setq *next-free-bit* (+ *count cm:*cube-address-length*)    ; leave space for count field
      *first-bit* *next-free-bit*
      *free-bits* nil)
(setq *allocations* 0
      *compactions* 0
      *losses* 0)
(setq *good (new-pos)
      *temp1 (new-pos)
      *temp3 (new-pos)
      *temp2 (new-pos))
(cm:move-constant-always *good 0 1)
(cm:write-to-processor 0 *good 1 1))

;;; These four functions are the approved way to build structure (defun new-assumption (&optional datum value)
  (let* ((indet (new-pos))
         (label (new-pos))
         (a (make-assumption :pos label :indet indet :datum datum :value value)))
    (push a *assumptions*)
    (cm:move-constant-always indet 1 1)
    a))

(defun new-node (&optional datum)
  (let ((n (make-node :datum datum)))
    (push n *nodes*)
    n))

(defun new-class (exclusive? closeable? &optional datum)
  (let ((c (make-class :exclusive? exclusive? :closeable? closeable? :datum datum)))
    (push c *classes*)
    c))

(defun new-justification (ante conseq &optional datum)
  (let ((j (make-justification :ante ante :conseq conseq :datum datum)))
    (dolist (na ante)
      (if (assumption? na)
          (push na (justification-ante-a-reversed j))
          (push j (node-conseqs na))))
    (push j *justifications*)
    (careful-enqueue j)
    j))

;;; Public functions for manipulating consumers and classes (defun attach-consumer (k nac)
  (cond ((class? nac)
         (push k (class-consumers nac))
         (dolist (na (class-members nac))
           (when (label-pos na)
             (funcall k na))))
        ((label-pos nac)
         (funcall k nac))
        ((node? nac)
         (push k (node-consumers nac)))))

(defmacro class-closed? (c)
  '(eq (class-closeable? .c) :closed))

(defmacro class-member? (na c)
  '(member .na (class-members .c) :test #'eq))

(defun close-class (c)
  (assert (class-closeable? c))
  (unless (class-closed? c)
    (setf (class-closeable? c) :closed)
    (unless *postpone-class-processing*
      (setf (class-needs-closure? c) t)
      (careful-enqueue c))))

(defun add-to-class (nas c &aux (queueit nil))
  (assert (not (class-closed? c)))
  (if (listp nas)
      (dolist (na nas)
        (when (internal-add-to-class na c)
          (setq queueit t)))
      (setq queueit (internal-add-to-class nas c))))
```

```
    (when (and (not *postpone-class-processing*)
               queueit
               (class-exclusive? c)
               (cdr (class-members c)))
      (setf (class-needs-excl? c) t)
      (careful-enqueue c)))

(defun run-class-constraints ()
  (dolist (c *classes*)
    (setf (class-needs-excl? c) (and (class-exclusive? c) (cdr (class-members c))))
    (setf (class-needs-closure? c) (class-closed? c))
    (when (or (class-needs-excl? c)
              (class-needs-closure? c))
      (delayed-enqueue c)))
  (when *queue-head*
    (clear-queue)))

(defun internal-add-to-class (na c)
  (assert (not (and (class-closeable? c) (node? na))))
  (unless (class-member? na c)
    (push na (class-members c))
    (cond ((label-pos na)
           (dolist (k (class-consumers c))
             (funcall k na)))
          ((node? na)
           (push c (node-consumers na))))
    t))

;;; Public functions for querying ATMS state (defun in? (na)
  (select-good)
  (or (and (assumption? na)
           (setf (assumption-indet na) (check-pos (assumption-indet na))))
      (setf (label-pos na) (check-pos (label-pos na)))))

(defun true? (na &aux (source (label-pos na)))
  (select-good)
  (when source
    (when (and (assumption? na) (assumption-indet na))
      (cm:logandc2 source (assumption-indet na) 1))
    (eql 1 (cm:global-logand source 1))))

(defun get-label (nas &aux (result nil) env)
  (select-good)
  (if (listp nas)
      (dolist (na nas)
        (reduce-by na))
      (reduce-by nas))
  (loop
    (when (eql 0 (cm:global-logior-always cm:context-flag 1))
      (return result))
    (setq env nil)
    (cm:move-always *temp1 cm:context-flag 1)
    ;; one pass through finding a minimal environment
    (dolist (a *assumptions*)
      (when (assumption-indet a)
        (cm:logandc2-always (label-pos a) (assumption-indet a) 1))
      (if (and (label-pos a) (eql 1 (cm:global-logand (label-pos a) 1)))
          (push a env)
          (cm:lognot cm:context-flag (label-pos a) 1)))
    ;; then another pass finding everyone covered by it
    (cm:move-always cm:context-flag *temp1 1)
    (dolist (a env)
      (when (assumption-indet a)
        (cm:logior (label-pos a) (assumption-indet a) 1))
      (cm:move cm:context-flag (label-pos a) 1))
    (push env result)
    (cm:logandc1-always cm:context-flag *temp1 1)))

;;; Private support for the state querying
(defun check-pos (pos)
  (and pos (if (*any pos)
               pos
               (progn (release-pos pos)
                      nil))))

(defun reduce-by (na)
  (when (and (assumption? na)
             (assumption-indet na))
    (cm:logior (label-pos na) (assumption-indet na) 1))
  (if (label-pos na)
      (cm:move cm:context-flag (label-pos na) 1)
      (cm:move-constant cm:context-flag 0 1)))

;;; Functions for maintaining the queue (everything from here on is private)

(defvar *queue-inactive* nil)
```

```
(defmacro enqueue (jc)
  '(setq *queue-tail* (setf (queueable-next-queue-item *queue-tail*) .jc)))

(defun careful-enqueue (jc)
  (unless (queueable-next-queue-item jc)
    (if *queue-head*
        (enqueue jc)
        (progn (setq *queue-head* (setq *queue-tail* jc))
               (unless *delay-queue* (clear-queue))))))

(defun delayed-enqueue (jc)
  (unless (queueable-next-queue-item jc)
    (if *queue-head*
        (enqueue jc)
        (setq *queue-head* (setq *queue-tail* jc)))))

(defun clear-queue (&aux (first-loss nil))
  (loop
    (if (if (class? *queue-head*)
            (let ((incomplete (and (class-needs-excl? *queue-head*)
                                   (setf (class-needs-excl? *queue-head*)
                                         (broadcast-excl-class (class-members *queue-head*))))))
              (or (and (class-needs-closure? *queue-head*) (setf (class-needs-closure? *queue-head*)
                                                                  (broadcast-class-closure (class-members *queue-head*))))
                  incomplete))
            (broadcast-justification *queue-head*))
        ;; we were unable to complete this broadcast, so move it to the end of the queue.
        ;; remember how long we've been doing this, so that if we get back to it and still
        ;; haven't made any progress we'll give up
        (progn
          (incf *losses*)
          (unless first-loss
            (setq first-loss *queue-head*))
          (enqueue *queue-head*)
          (setq *queue-head* (shiftf (queueable-next-queue-item *queue-head*) nil))
          (when (eq first-loss *queue-head*)
            (return-from clear-queue nil)))
        ;; the broadcast was successful, so pop this one and move on to the next
        (when (null (setq *queue-head* (shiftf (queueable-next-queue-item *queue-head*)
                                               (setq first-loss nil))))
          (setq *queue-tail* nil)
          (return nil))
        )))

;;; Compacting and forking the processor pool (defun compact ()
  ;; reduce *free-start* as much as possible. clobbers *count.
  (incf *compactions*)
  (select-good)
  (setq *free-start* (cm:enumerate-and-count *count cm:*cube-address-length*))
  (send-properly)
  (cm:move-always *good cm:test-flag 1)
  (setq *compactable* nil))

(defun fork (flag mark &aux (overflow nil))
  (note-function-call 'fork)
  ;; copy all processors with flag set, and clear mark in the copies. compact if we have
  ;; to, and error if there just aren't enough processors.
  (cm:move-always cm:context-flag flag 1)
  (let ((needed (cm:enumerate-and-count *count cm:*cube-address-length*)))
    (unless (or (<= (+ *free-start* needed) *num-proc*)
                (and *compactable*
                     (progn (compact)
                            (cm:logand-always flag *good 1)
                            (cm:move-always cm:context-flag flag 1)
                            (cm:enumerate *count cm:*cube-address-length*)
                            (<= (+ *free-start* needed) *num-proc*)
                            )))
      '(format t ""%Delayed fork. Tried for ~6d Got ~6d"
              needed (- *num-proc* *free-start*))
      (setq needed (- *num-proc* *free-start*))
      (cm:u<constant *count needed cm:*cube-address-length*)
      (cm:logand flag cm:test-flag 1)
      (cm:logand mark cm:test-flag 1)
      (cm:move cm:context-flag cm:test-flag 1)
      (setq overflow t))
    (cm:u+constant *count *free-start* cm:*cube-address-length*)
    (send-properly)
    (cm:logandc2-always mark cm:test-flag 1)
    (incf *allocations* needed)
    (incf *free-start* needed)
    overflow))

(defun send-properly (&aux (bits (- *next-free-bit* *first-bit*))
                           (start *first-bit*)
                           size)
```

```
(loop
  (cm:move-always *send-buffer start (setq size (min bits send-buffer-size)))
  (cm:send start *count *send-buffer size)
  (when (<= bits send-buffer-size) (return nil))
  (incf start send-buffer-size)
  (decf bits send-buffer-size)))

;;; Broadcasting (defun broadcast-justification (j &aux (incomplete nil))
  (note-function-call 'b-just)
  (let* ((conseq (justification-conseq j))
         (dest (label-pos conseq))
         (conseq-a? (assumption? conseq))
         conseq-indet)

;; if the consequent is a determinate assumption with value 0 (e.g. *contradiction*),
    ;; we want to force one of the antecedants to 0. we will force the first indeterminate
    ;; assumption (and fork on any others); *temp2 keeps track of which environments can
    ;; still be forced -- it's 0 if we can still force something. if the consequence is
    ;; indeterminate we also make sure that the label bit is 0, since we'd otherwise ignore
    ;; it.
    (when conseq-a?
      (if (setq conseq-indet (assumption-indet conseq))
          (progn (cm:logandc2-always dest conseq-indet 1)
                 (cm:move-always *temp2 conseq-indet 1))
          (cm:move-constant-always *temp2 0 1)))

;; context-flag will keep track of which envs we're interested in -- to start with, those
    ;; where the consequent isn't already 1.
    (select-good)
    (when dest
      (cm:lognot cm:context-flag dest 1))

;; for each antecedant, forget those environments in which its known to be 0 (and
    ;; just leave if it's 0 everywhere). if we can force an antecedant, we mark every
    ;; indeterminate assumption except the first (in each environment) as "must fork"
    ;; (using the label bit).
    (dolist (na (justification-ante j))
      (let ((source (label-pos na)))
        (unless source (return-from broadcast-justification nil))
        (if (or (node? na) (not (assumption-indet na)))
            (cm:move cm:context-flag source 1)
            (progn (cm:logior source (assumption-indet na) 1)
                   (cm:move cm:context-flag source 1)
                   (when conseq-a?
                     (cm:move-always *temp1 cm:context-flag 1)
                     (cm:move cm:context-flag (assumption-indet na) 1)
                     (cm:move source *temp2 1)
                     (cm:move-constant *temp2 1 1)
                     (cm:move-always cm:context-flag *temp1 1))))))
    (*global-any cm:context-flag))

;; if there are still some environments left, do another pass through them to fork
    ;; on each of the indeterminate environments.
    (when (*global-any cm:context-flag)
      (dolist (a (justification-ante-a-reversed j))
        (when (assumption-indet a)
          (let ((indet (assumption-indet a))
                (source (label-pos a)))
            (cm:move-always *temp1 cm:context-flag 1)
            (when conseq-a?
              ;; we might be able to force some of these instead of forking them
              (cm:move cm:context-flag indet 1)
              (cm:lognot cm:context-flag source 1)
              (cm:move-constant indet 0 1)
              (cm:move-constant *temp1 0 1))
            ;; use *temp2 to record which environments need to be forked
            (cm:move-always *temp2 *temp1 1)
            (cm:logand-always *temp2 indet 1)
            ;; fork them, throw out the ones with 0's, and mark them all determinate
            (when (*global-any *temp2)
              (when (fork *temp2 *temp1)
                (setq incomplete t))
              (cm:move-always cm:context-flag *temp2 1)
              (cm:move-constant indet 0 1)
              (cm:move source *temp1 1))
            (cm:move-always cm:context-flag *temp1 1)))))
    ;; unless we forced them all, it's time to take care of the remaining environments
    (when (*global-any cm:context-flag)
      (if conseq-a?
          ;; if the consequent is an assumption, the indeterminates are forced (to 1)
          ;; and the others die (since they must already be 0)
          (if conseq-indet
              (progn (cm:logior dest conseq-indet 1)
                     (cm:logand *good conseq-indet 1)
                     (unless (eql 1 (cm:global-logand conseq-indet 1))
                       (setq *compactable* t))
```

```
                    (cm:move-constant conseq-indet 0 1))
            (progn (cm:move-constant *good 0 1)
                   (setq *compactable* t)))
        ;; if the consequent is a node we're just going to make it 1.  if it doesn't
        ;; already have a position we assign it one, and fire any waiting consumers.
        ;; and then, since this node's label has changed (by at least one environment,
        ;; otherwise we wouldn't be here) we queue all its consequences.
        (progn (if dest
                   (cm:move-constant dest 1 1)
                   (progn (setf (label-pos conseq) (setq dest (new-pos)))
                          (cm:move-always dest cm:context-flag 1)
                          (dolist (k (node-consumers conseq))
                            (if (class? k)
                                (dolist (k (class-consumers k))
                                  (funcall k conseq))
                                (funcall k conseq)))))
               (dolist (q (node-conseqs conseq))
                 (unless (queueable-next-queue-item q)
                   (enqueue q)))))))))
  incomplete)

(defun broadcast-class-closure (as &aux (incomplete nil))
  (note-function-call 'b-close)
  ;; kill all environments which don't have at least one of these assumptions.  similar to
  ;; a nogood, but (a) we know they're all assumptions, and (b) the sense is complemented.

;; this code is based on broadcast-justification; any changes to it may belong here too.

;; like justifications, we try to force rather than fork and delete (although now we
  ;; force to 1).  as usual, *temp2 keeps track of environments which can still be forced.
  (cm:move-constant-always *temp2 0 1)

;; context-flag will keep track of which envs we're interested in.
  (select-good)

;; for each antecedant, forget those environments in which it is known to be 1.  mark
  ;; each indeterminate assumption except the first (in each environment) as "must fork"
  ;; (using the label bit).
  (dolist (a as)
    (let ((source (label-pos a)))
      (when source
        (if (not (assumption-indet a))
            (cm:lognot cm:context-flag source 1)
            (progn (cm:logandc2 source (assumption-indet a) 1)
                   (cm:lognot cm:context-flag source 1)
                   (cm:move-always *temp1 cm:context-flag 1)
                   (cm:move cm:context-flag (assumption-indet a) 1)
                   (cm:move source *temp2 1)
                   (cm:move-constant *temp2 1 1)
                   (cm:move-always cm:context-flag *temp1 1))))))

;; if there are still some environments left, do another pass through them to fork
  ;; on each of the indeterminate environments.
  (when (*global-any cm:context-flag)
    (dolist (a (reverse as))
      (when (assumption-indet a)
        (let ((indet (assumption-indet a))
              (source (label-pos a)))
          ;; we might be able to force some of these instead of forking them
          (cm:move-always *temp1 cm:context-flag 1)
          (cm:move cm:context-flag indet 1)
          (cm:lognot cm:context-flag source 1)
          (cm:move-constant indet 0 1)
          (cm:move-constant source 1 1)
          (cm:move-constant *temp1 0 1)
          ;; use *temp2 to record which environments need to be forked
          (cm:move-always *temp2 *temp1 1)
          (cm:logand-always *temp2 indet 1)
          ;; fork them, throw out the ones with 1's, and mark them all determinate
          (when (*global-any *temp2)
            (when (fork *temp2 *temp1)
              (setq incomplete t))
            (cm:move-always cm:context-flag *temp2 1)
            (cm:move-constant indet 0 1)
            (cm:lognot source *temp1 1))
          (cm:move-always cm:context-flag *temp1 1)))))
  ;; unless we forced them all, it's time to take care of the remaining environments
  (when (*global-any cm:context-flag)
    (cm:move-constant *good 0 1)
    (setq *compactable* t)))
  incomplete)

(defun count-selected (label)
  (let ((count (cm:global-count cm:context-flag)))
    (format t "~%~a: ~6d" label count)
    nil))
```

```
(defun broadcast-excl-class (members &aux (indets nil) source indet (incomplete nil))
  (note-function-call 'b-excl)
  ;; equivalent to broadcasting pairwise nogoods for each pair from members, but much more
  ;; efficient ;; *temp2 are the nodes which must be forked (have already had one assumption forced)
  ;; *temp1 are the *good nodes which have at least one antecedant 1
  ;; indets accumulates the indeterminate assumptions, in reverse order
  (select-good)
  (cm:move-constant-always *temp1 0 1)
  (cm:move-constant-always *temp2 0 1)
  (dolist (na members)
    (when (setq source (label-pos na))
      (when (setq indet (and (assumption? na) (assumption-indet na)))
        (cm:logandc2 source indet 1)
        (cm:lognot cm:context-flag indet 1))
      ;; in the selected environments the value is known; if it's the second 1, they're dead
      (cm:move cm:context-flag *temp1 1)
      (cm:move cm:context-flag source 1)
      (when (*global-any cm:context-flag)
        (cm:move-constant *good 0 1)
        (setq *compactable* t))
      (select-good)
      (cm:logior *temp1 source 1)
      (when indet
        ;; now take care of those in which the value is unknown
        (cm:move cm:context-flag indet 1)
        ;; if we've already seen a 1, we can just force it to a 0
        (cm:logandc2 indet *temp1 1)
        (cm:logandc2 source *temp1 1)
        ;; otherwise, mark it to be reexamined
        (unless (eql 1 (cm:global-logand *temp1 1))
          (cm:lognot cm:context-flag *temp1 1)
          (cm:move source *temp2 1)
          (cm:move-constant *temp2 1 1)
          (push na indets)))
      (cm:move-always cm:context-flag *good 1)
      )))

;; now go back through the assumptions, forking
  (cm:move-always *temp3 *good 1)
  (dolist (a indets)
    (let ((source (label-pos a))
          (indet (assumption-indet a)))
      ;; if we found a 1 later in the sequence we just force it to 0
      (cm:move-always cm:context-flag *temp1 1)
      (cm:logandc2 source indet 1)
      (cm:move-constant indet 0 1)
      ;; otherwise, unless this is the last indeterminate we better fork
      (cm:move-always *temp2 *temp3 1)
      (cm:logand-always *temp2 indet 1)
      (cm:logand-always *temp2 source 1)
      (when (*global-any *temp2)
        (when (fork *temp2 *temp3)
          (cm:logand-always *temp1 *temp3 1)
          (setq incomplete t))
        (cm:move-always cm:context-flag *temp2 1)
        (cm:move source *temp3 1)
        (cm:move-constant *temp3 1 1)
        (cm:move *temp1 source 1)
        (cm:move-constant indet 0 1))))
  incomplete)

;;; pretty displaying (defun print-justification (j str &optional d)
  (declare (ignore d))
  (dolist (na (justification-ante j))
    (print-na na str)
    (princ " " str))
  (princ "=> " str)
  (print-na (justification-conseq j) str))

(defun print-justs ()
  (dolist (j *justifications*)
    (terpri t)
    (print-justification j t))
  (values))

(defun print-na (na str)
  (if (node? na)
      (princ (node-datum na) str)
      (if (assumption-value na)
          (format str "~A=~A" (assumption-datum na) (assumption-value na))
          (princ (assumption-datum na) str))))

;;; debugging tools
```

```
(defun print-proc (p)
  (dolist (a *assumptions*)
    (cond ((and (assumption-indet a)
                (eql 1 (cm:unsigned-read-from-processor p (assumption-indet a) 1)))
           (princ " ?" t) (print-na a t))
          ((and (label-pos a)
                (eql 1 (cm:unsigned-read-from-processor p (label-pos a) 1)))
           (princ " " t) (print-na a t))))
  (dolist (n *nodes*)
    (when (and (label-pos n)
               (eql 1 (cm:unsigned-read-from-processor p (label-pos n) 1)))
      (format t " ~A" (node-datum n)))))

(defun print-procs ()
  (dotimes (p *free-start*)
    (when (eql 1 (cm:unsigned-read-from-processor p *good 1))
      (format t "~%~A:" p)
      (print-proc p))))

(defun print-selected-procs ()
  (dotimes (p *free-start*)
    (when (eql 1 (cm:unsigned-read-from-processor p cm:context-flag 1))
      (format t "~%~A:" p)
      (print-proc p))))

(defun print-statistics ()
  (format t "~%Allocations: ~D~%Compactions: ~D~%Losses: ~D"
          *allocations* *compactions* *losses*)
  (format T "~% Number of TMS nodes: ~D" (length matms::*nodes*))
  (format T "~% Number of TMS classes: ~D" (length matms::*classes*))
  (format T "~% Number of assumptions: ~D" (length matms::*assumptions*))
  (multiple-value-call #'format T "~% Number of environments: ~D ~A" (matms::count-procs)))

(defun count-procs (&aux (result (list 0)) temp)
  (compact)
  (dotimes (p *free-start*)
    (when (eql 1 (cm:unsigned-read-from-processor p *good 1))
      (setq temp result)
      (dolist (a *assumptions*)
        (when (and (assumption-indet a)
                   (eql 1 (cm:unsigned-read-from-processor p (assumption-indet a) 1)))
          (setq temp (or (cdr temp)
                         (setf (cdr temp) (list 0))))))
      (incf (car temp))))
  (values (count-envs result) result))

(defun count-goods ()
  (select-good)
  (cm:enumerate-and-count *count cm:*cube-address-length*))

(defun count-envs (r)
  (if r
      (+ (car r) (* 2 (count-envs (cdr r))))
      0))

(defun print-label (nas)
  (terpri t)
  (dolist (env (get-label nas))
    (format t "[")
    (dolist (a env)
      (format t " ~A" (assumption-datum a)))
    (format t "]~%")))

(defun selected-procs (&aux (result nil) p)
  (dotimes (i *free-start* result)
    (setq p (- *free-start* (1+ i)))
    (when (eql 1 (cm:unsigned-read-from-processor p cm:context-flag 1))
      (push p result))))

;;; tests (defun n-new-classes (n exclusive? closeable? &aux (result nil))
  (dotimes (i n result)
    (push (new-class exclusive? closeable?) result)))

(defun run-through-queue ()
  (loop with allocation-history
        while *queue-head*
        do (compact)
           (clear-queue)
        do (push *allocations* allocation-history)
        do (format t "~%Allocated ~d" *allocations*)
        when (equal (first allocation-history)
                    (third allocation-history))
          do (format t "~%Wedged")
             (return nil)))
```

```
(defun do-n-queens (n)
  (let ((rs (n-new-classes n t nil))
        (up (n-new-classes (* 2 n) t nil))
        (dn (n-new-classes (* 2 n) t nil)))
    (dotimes (i n)
      (let ((cl (new-class t t))
            (d (nthcdr (- n (1+ i)) dn))
            (u (nthcdr i up)))
        (dotimes (j n)
          (let ((a (new-assumption (format nil "~A-~A" i j))))
            (add-to-class a (nth j rs))
            (add-to-class a cl)
            (add-to-class a (pop d))
            (add-to-class a (pop u))))
        (close-class cl))))
  (run-through-queue)
)

(defun n-queens (n)
  (format t "~%*===============================================================*")
  (format t "~%~2d Queens" n)
  (init-atms)
  (cm:time (do-n-queens n))

(print-statistics)
  (format t "~%Goods ~6d" (count-goods))
  (show-function-calls))
```

What is claimed:

1. A method of operating a system;

the system including a parallel processor, the parallel processor having a plurality of processing units including first and second processing units, each processing unit having respective memory for storing data, the parallel processor further including data providing means for storing data in the second processing unit's respective memory based on data stored in the first processing unit's respective memory;

the method performing a propositional reasoning task on a set of formulas; the formulas including a number of elements, each element having a respective set of possible values so that the elements together have a number of possible combinations of values, each possible combination of values including, for each element, at most one of the respective set of possible values; the elements including a first element whose respective set of possible values includes a first value; the propositional reasoning task searching for possible combinations of values that are consistent with the set of formulas;

the method comprising steps of:

operating the parallel processor to store data in the first processing unit's respective memory indicating a first one of the possible combinations of values; the first element not being assigned any of its respective possible values in the first possible combination of values so that the first possible combination of values does not include any of the possible values of the first element;

operating the first processing unit to perform a first propositional reasoning operation for the first possible combination of values;

operating the data providing means to store data in the second processing unit's respective memory based on the data stored in the first processing unit's respective memory so that the data in the second processing unit's respective memory indicates a second one of the possible combinations of values; the second possible combination of values being a subcombination of the first possible combination of values, the first element being assigned its first value in the second possible combination of values so that the second possible combination of values includes the first element's first value; and operating the second processing unit to perform a second propositional reasoning operation for the second possible combination of values.

2. The method of claim 1 in which the first element's respective set of possible values further includes a second value, the method further comprising steps of:

modifying the data stored in the first processing unit's respective memory to indicate a third one of the possible combinations of values; the third possible combination of values being a subcombination of the first possible combination of values, the first element being assigned its second value in the third possible combination of values so that the third possible combination of values includes the first element's second value; the second and third possible combinations of values being independent; and operating the first processing unit to perform the second propositional reasoning operation for the third possible combination of values so that the first and second processing units perform the second propositional reasoning operation in parallel.

3. The method of claim 1 in which the data stored in the first processing unit's respective memory indicate that the first element has not yet been assigned any of its respective possible values in the first possible combination of values; the step of operating the first processing unit to perform the first propositional reasoning operating for the first possible combination of values comprising a substep of determining that it is necessary to assign the first and second values to the first element.

4. The method of claim 1 in which the step of operating the parallel processor stores data in the first processing unit's respective memory by performing a sequence of propositional reasoning operations that store data in the first processing unit's respective memory indicating the first possible combination of values.

5. A method of operating a system;

the system including a host processor and a parallel processor, the parallel processor having a plurality of processing units, each processing unit having respective memory for storing data; the host processing being connected for providing instructions to the parallel processor; the parallel processor further including results providing means for providing results data to the host processor indicating the results of operations performed in response to instructions;
the method comprising steps of:
operating the host processor to obtain a set of formulas; the formulas including a number of elements, each element having a respective set of possible values so that the elements together have a number of possible combinations of values, each possible combination of values including, for each element, at most one of the respective set of possible values; and
operating the host processor to provide a sequence of instructions to the parallel processor so that the parallel processor searches for possible combinations of values that are consistent with the set of formulas; the sequence of instructions including:
a first subsequence of instructions in response to which the parallel processor operates to store data indicating a respective one of the possible combinations of values in the respective memory of each of an active set of the processing units;
a second subsequence of instructions in response to which each of the processing units in the active set performs a first propositional reasoning operation for the respective possible combination of values and the results providing means provides results data to the host processor indicating the results of the first propositional reasoning operation; and
a third subsequence of instructions in response to which each of the processing units in the active set performs a second propositional reasoning operation, the host processor providing the third subsequence of instructions based on the results indicated by the results data.

6. The method of claim 5 in which the results data indicate that the first propositional reasoning operation failed; the second propositional reasoning operation modifying the active set and storing data indicating a respective one of the possible combinations of values in the respective memory of each of the modified active set of the processing units; the sequence of instructions further including a fourth subsequence of instructions in response to which each of the processing units in the modified active set performs the first propositional reasoning operation for the respective possible combination of values.

7. The method of claim 6 in which the second propositional reasoning operation modifies the active set by adding processing units to the active set.

8. The method of claim 6 in which the second propositional reasoning operation modifies the active set by removing processing units from the active set.

9. The method of claim 5 in which the elements include a first element whose respective set of possible values includes a first value and a second value; each processing unit in the active set performing the first propositional reasoning operation by determining whether the first element has one of the first and second values in its respective possible combination of values and, if not, attempting to provide data to a paired processing unit so that the processing unit in the active set and the paired processing unit have respective possible combinations of values in one of which the first element has the first value and in the other of which the first element has the second value; the results data indicating whether each processing unit that attempted to provide data to a paired processing unit succeeded.

10. The method of claim 9 in which the elements include a second element whose respective set of possible values includes a first value and a second value; each processing unit in the active set performing the second propositional reasoning operation by removing itself from the active set if its respective possible combination of values includes the first value for the second element.

11. The method of claim 10 in which the results data further indicate numbers of the processing units in the active set that have respective possible combinations of values that include the first and second values for the second element and that have respective possible combinations of values that include the first and second values for the first element; the results data indicating a number having the second value for the second element that is less than a number having the first value for the second element and a number having the second value for the first element that is less than a number having the first value for the first element, the results data further indicating a number having the second value for the second element that is greater than a number having the second value for the first element; the method further comprising a step of operating the host processor to select the second element for use in the second propositional reasoning operation rather than the first element based on the numbers of the processing units indicated by the results data; the second element being selected because the number of processing units having the second value for the second element is less than the number having the first value for the second element but is greater than the number having the second value for the first element.

12. The method of claim 5 in which the elements include a first element; each processing unit's respective memory including a plurality of bit positions; the parallel processor operating in response to the first subsequence of instructions by storing data in an indeterminate bit position of each of the active set of processing units indicating whether the first element has an indeterminate value in the respective possible combination of values; the results data indicating that the indeterminate bit position data does not indicate that the first element has an intermediate value in any of the active set of processing units; the method further comprising a step of operating the host processor to reclaim the indeterminate bit position.

13. The method of claim 5 in which the elements include a first element whose respective set of possible values includes a first value and a second value; each processing unit's respective memory including a plurality of bit positions; the parallel processor operating in response to the first subsequence of instructions by storing data in a label bit position of each of the active set of processing units indicating whether the first element has the first value or the second value in the respective possible combination of values; the results data indicating that none of the active set of processing units have data in the label bit position indicating that the first element has the first value; the method further comprising a step of operating the host processor to reclaim the label bit position.

14. The method of claim 5 in which the parallel processor responds to the first subsequence of instructions by performing a sequence of propositional reasoning operations that, for each processing unit in the active set of processing units, store data indicating the processing unit's respective one of the possible combinations of values in the processing unit's respective memory.

15. A method of operating a system;
the system including a parallel processor, the parallel processor having a plurality of processing units including first and second processing units, each processing unit having respective memory for storing data;
the method performing a propositional reasoning task on a set of formulas; the formulas including a number of elements, each element having a respective set of possible values so that the elements together have a number of possible combinations of values, each possible combination of values including, for each element, at most one of the respective set of possible values; the elements including a first element whose respective set of possible values includes a first value and a second value; the propositional reasoning task searching for possible combinations of values that are consistent with the set of formulas;
the method comprising steps of:
operating the parallel processor to store data in the first processing unit's respective memory indicating a first one of the possible combinations of values and to store data in the second processing unit's respective memory indicating a second one of the possible combinations of values; the first element being assigned the first value in the first possible combination of values and the second value in the second possible combination of values so that the first possible combination of values includes the first element's first value and the second possible combination of values includes the first element's second value; the first and second possible combinations of values being independent subcombinations of a third one of the possible combinations of values in which the first element is not assigned a value; and
operating the first processing unit and the second processing unit in parallel to perform propositional reasoning for the first and second possible combinations of values.

16. The method of claim 15 in which the step of operating the parallel processor stores data in the first processing unit's respective memory and stores data in the second processing unit's respective memory by performing a sequence of propositional reasoning operations that store data in the first processing unit's respective memory indicating the first possible combination of values and that store data in the second processing unit's respective memory indicating the second possible combination of values.

17. The method of claim 15 in which the step of operating the first and second processing units comprises substeps of:
operating the first and second processing units to perform a first propositional reasoning operation that produces and stored data indicating whether the first and second possible combinations of values are consistent with one of the formulas; the first processing unit producing and storing in its respective memory data indicating that the first possible combination of values is consistent with the formula; the second processing unit producing and storing in its respective memory data indicating that the second possible combination of values is inconsistent with the formula; and
operating the second processing unit to stop performing propositional reasoning for the second possible combination of values.

18. The method of claim 15 in which the elements include a second element whose respective set of possible values includes a first value and a second value; the second element not being assigned a value in the first possible combination of values; the formulas including a formula that requires that the second element must have its first value in the first possible combination of values; the step of operating the first and second processing units comprising a substep of operating the first processing unit to modify the first possible combination of values by assigning the second element its first value.

19. A system that comprises a host processor and a parallel processor;
the system being for performing a propositional reasoning task on a set of formulas; the formulas including a number of elements, each element having a respective set of possible values so that the elements together have a number of possible combinations of values, each possible combination of values including, for each element, at most one of the respective set of possible values; the elements including a first element whose respective set of possible values includes a first value and a second value; the propositional reasoning task searching for possible combinations of values that are consistent with the set of formulas;
the parallel processor comprising a plurality of processing units including first and second processing units, each processing unit having respective memory for storing data;
the host processing comprising:
means for operating the parallel processor to store first data in the first processing unit's respective memory indicating a first one of the possible combinations of values and second data in the second processing unit's respective memory indicating a second one of the possible combinations of values; the first element being assigned the first value in the first possible combination of values and the second value in the second possible combination of values so that the first possible combination of values includes the first element's first value and the second possible combination of values includes the first element's second value; the first and second possible combinations of values being independent subcombinations of a third one of the possible combinations of values in which the first element is not assigned a value; and
means for operating the first processing unit and the second processing unit in parallel to perform propositional reasoning for the first and second possible combination of values; the first processing unit using the first data to perform propositional reasoning for the first possible combination of values and the second processing unit using the second data to perform propositional reasoning for the second possible combination of values.

20. The system of claim 19 in which the parallel processor further comprises means for obtaining propositional reasoning results from the first and second processing units and for combining those results into a combined result.

21. The system of claim 19 in which the parallel processor comprises a massively parallel processor that includes the first and second processing units.

22. The system of claim 19 in which the host processor further comprises means for operating as an inference engine.

23. The system of claim 22 in which the host processor further comprises means for operating as an interface between the means for operating as an inference engine and the parallel processor.

* * * * *